US012671992B2

(12) United States Patent
Polacheck

(10) Patent No.: US 12,671,992 B2
(45) Date of Patent: Jun. 30, 2026

(54) SYSTEMS AND METHODS FOR AN INSTANT VIRTUAL ACCESS POINT

(71) Applicants: Allied Telesis Holdings Kabushiki Kaisha, Tokyo (JP); Allied Telesis Holdings K.K., Tokyo (JP); Allied Telesis, Inc., Bothell, WA (US)

(72) Inventor: Shuval Polacheck, Shefayim (IL)

(73) Assignee: Allied Telesis Holdings Kabushiki Kaisha, Tokyo (JP)

( * ) Notice: Subject to any disclaimer, the term of this patent is extended or adjusted under 35 U.S.C. 154(b) by 326 days.

(21) Appl. No.: 18/588,263

(22) Filed: Feb. 27, 2024

(65) Prior Publication Data
US 2025/0274756 A1     Aug. 28, 2025

(51) Int. Cl.
| | |
|---|---|
| *H04W 12/08* | (2021.01) |
| *H04W 12/04* | (2021.01) |
| *H04W 12/06* | (2021.01) |
| *H04W 88/08* | (2009.01) |

(52) U.S. Cl.
CPC ........... *H04W 12/08* (2013.01); *H04W 12/04* (2013.01); *H04W 12/06* (2013.01); *H04W 88/085* (2013.01)

(58) Field of Classification Search
CPC ..... H04W 12/08; H04W 12/06; H04W 12/04; H04W 88/085
See application file for complete search history.

(56) References Cited

U.S. PATENT DOCUMENTS

| | | | | |
|---|---|---|---|---|
| 8,856,290 | B2 * | 10/2014 | Couto ................. | H04L 61/5014 709/220 |
| 10,602,379 | B2 * | 3/2020 | Lin ........................ | H04W 24/02 |
| 11,184,741 | B1 * | 11/2021 | Kannan ................. | H04W 84/12 |
| 11,206,714 | B2 * | 12/2021 | Polacheck ........... | H04L 12/2867 |
| 11,540,245 | B2 * | 12/2022 | Lee ........................ | H04W 8/005 |
| 11,665,760 | B2 * | 5/2023 | Ho ........................ | H04W 84/12 370/329 |
| 11,930,359 | B2 * | 3/2024 | Konda ................. | H04W 12/069 |
| 12,231,884 | B2 * | 2/2025 | Neipris ............... | H04W 12/043 |
| 2003/0158922 | A1 * | 8/2003 | Park ....................... | H04W 12/50 709/222 |
| 2008/0002653 | A1 * | 1/2008 | Hung ................... | H04W 12/062 713/168 |
| 2008/0040486 | A1 * | 2/2008 | Kezys ..................... | H04W 8/18 709/227 |
| 2009/0141685 | A1 * | 6/2009 | Berglund .......... | H04W 36/0058 370/331 |

(Continued)

*Primary Examiner* — Steven S Kelley
(74) *Attorney, Agent, or Firm* — Command IP LLP; Michael Zarrabian

(57) ABSTRACT
Systems and methods for providing instant secured network access for station devices. Multiple sets of SSIDs and passphrases construct different instant virtual access points (iVAPs) by utilizing a hidden virtual access point (VAP); where station devices can connect to the hidden VAP using different iVAP credentials, reducing the security risk as the unique access credentials allow the station devices to access the hidden VAP without other devices decrypting the data; where iVAPs can be created, deleted, and modified without changing the VAP configurations, without disconnections, and without system downtime; and where the iVAP solution includes using hidden SSIDs, sending decoy beacons and probe responses, an association process, and a 4-way handshake.

20 Claims, 11 Drawing Sheets

(56) References Cited

U.S. PATENT DOCUMENTS

| | | | |
|---|---|---|---|
| 2010/0020746 A1* | 1/2010 | Zaks | H04L 63/20 |
| | | | 370/328 |
| 2013/0095789 A1* | 4/2013 | Keevill | H04W 12/068 |
| | | | 455/411 |
| 2014/0204927 A1* | 7/2014 | Horn | H04W 76/16 |
| | | | 370/338 |
| 2016/0330229 A1* | 11/2016 | Watson | H04L 63/1441 |
| 2020/0059791 A1* | 2/2020 | Yang | H04W 72/0453 |
| 2020/0107197 A1* | 4/2020 | Kaushik | H04W 88/08 |
| 2020/0213936 A1* | 7/2020 | Fan | H04W 48/18 |
| 2020/0280918 A1* | 9/2020 | Huang | H04W 80/02 |
| 2021/0099873 A1* | 4/2021 | Windsor | H04L 63/0892 |
| 2021/0099876 A1* | 4/2021 | Neipris | H04W 4/50 |
| 2021/0282007 A1* | 9/2021 | Ho | H04W 12/03 |
| 2023/0014215 A1* | 1/2023 | Liang | H04W 48/20 |
| 2023/0067513 A1* | 3/2023 | Khoury | H04W 48/08 |
| 2023/0077413 A1* | 3/2023 | Jiao | H04W 48/10 |
| | | | 370/329 |
| 2023/0232315 A1* | 7/2023 | Chitrakar | H04W 48/12 |
| | | | 370/329 |
| 2023/0232389 A1* | 7/2023 | Shao | H04W 72/046 |
| | | | 370/329 |
| 2023/0345562 A1* | 10/2023 | Hsu | H04W 76/11 |
| 2023/0370952 A1* | 11/2023 | Changlani | H04W 24/02 |

* cited by examiner

200

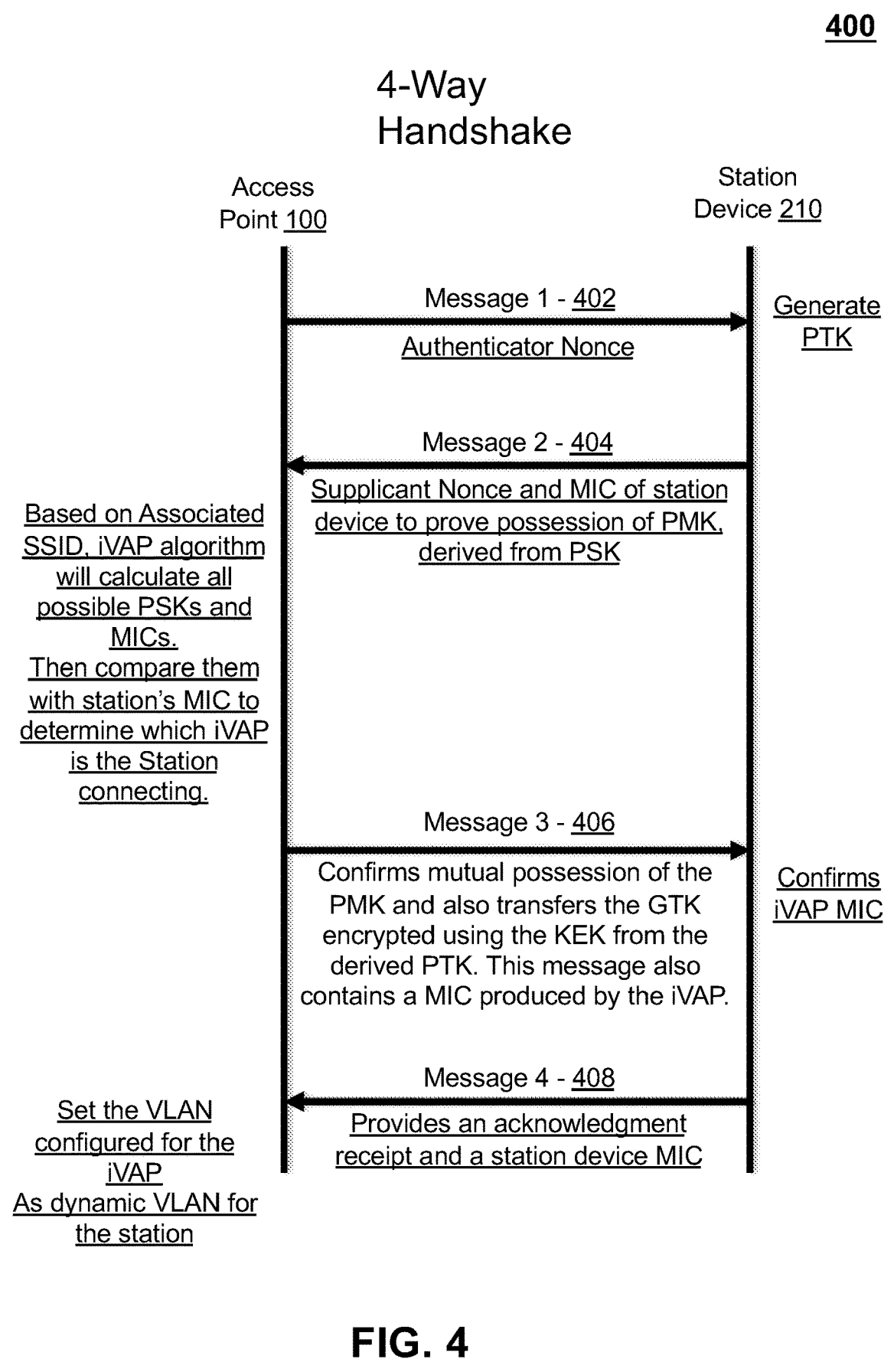

400

4-Way Handshake

Access Point 100

Station Device 210

Message 1 - 402

Authenticator Nonce

Generate PTK

Message 2 - 404

Supplicant Nonce and MIC of station device to prove possession of PMK, derived from PSK Based on Associated SSID, iVAP algorithm will calculate all possible PSKs and MICs.
Then compare them with station's MIC to determine which iVAP is the Station connecting.

Message 3 - 406

Confirms mutual possession of the PMK and also transfers the GTK encrypted using the KEK from the derived PTK. This message also contains a MIC produced by the iVAP.

Confirms iVAP MIC

Message 4 - 408

Provides an acknowledgment receipt and a station device MIC

Set the VLAN configured for the iVAP
As dynamic VLAN for the station

FIG. 4

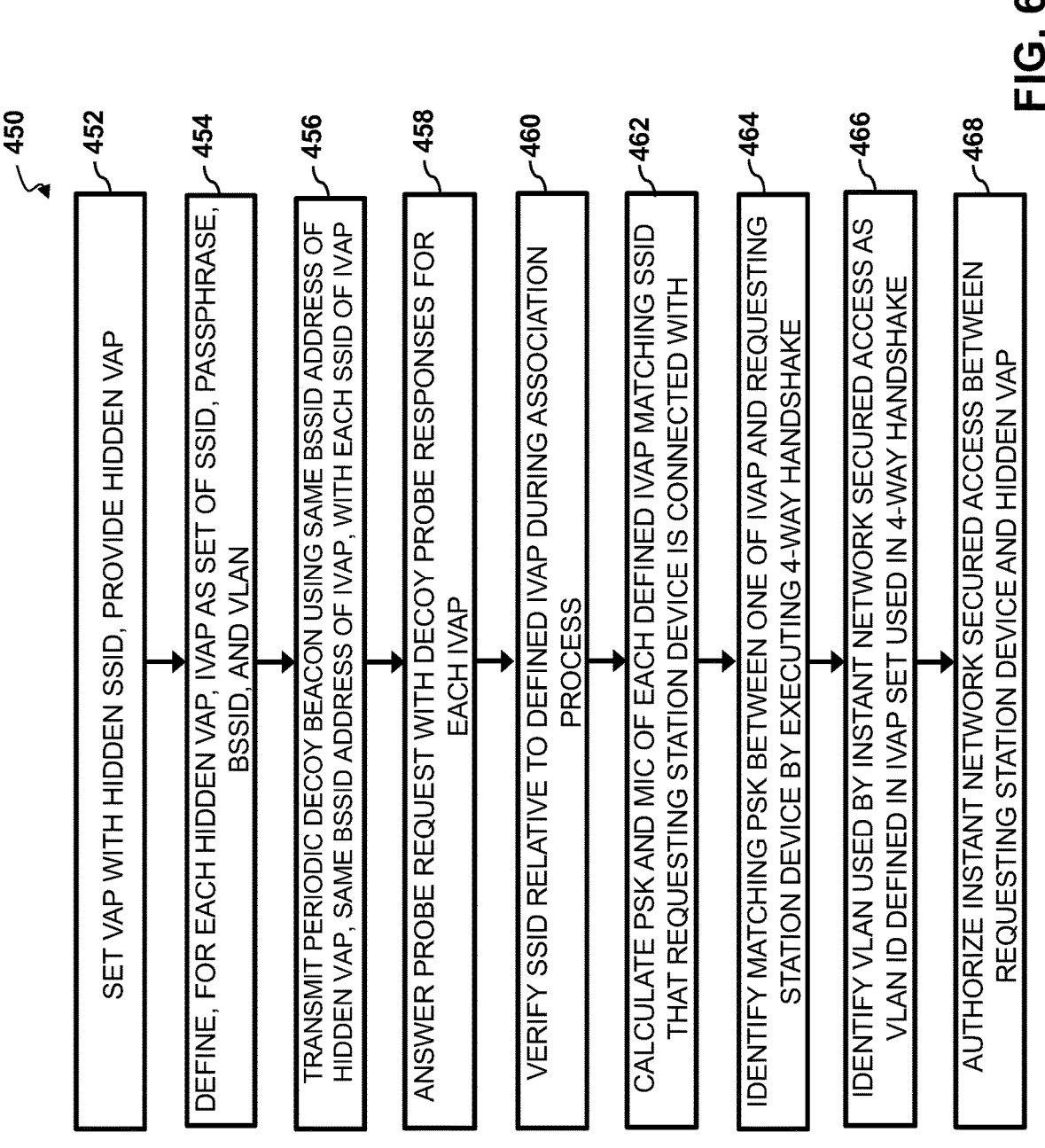

450

452 — SET VAP WITH HIDDEN SSID, PROVIDE HIDDEN VAP

454 — DEFINE, FOR EACH HIDDEN VAP, IVAP AS SET OF SSID, PASSPHRASE, BSSID, AND VLAN

456 — TRANSMIT PERIODIC DECOY BEACON USING SAME BSSID ADDRESS OF HIDDEN VAP, SAME BSSID ADDRESS OF IVAP, WITH EACH SSID OF IVAP

458 — ANSWER PROBE REQUEST WITH DECOY PROBE RESPONSES FOR EACH IVAP

460 — VERIFY SSID RELATIVE TO DEFINED IVAP DURING ASSOCIATION PROCESS

462 — CALCULATE PSK AND MIC OF EACH DEFINED IVAP MATCHING SSID THAT REQUESTING STATION DEVICE IS CONNECTED WITH

464 — IDENTIFY MATCHING PSK BETWEEN ONE OF IVAP AND REQUESTING STATION DEVICE BY EXECUTING 4-WAY HANDSHAKE

466 — IDENTIFY VLAN USED BY INSTANT NETWORK SECURED ACCESS AS VLAN ID DEFINED IN IVAP SET USED IN 4-WAY HANDSHAKE

468 — AUTHORIZE INSTANT NETWORK SECURED ACCESS BETWEEN REQUESTING STATION DEVICE AND HIDDEN VAP

Storage device 1408

Removable Storage device 1410

Communications interface 1412

Communication link 1416

Communication Infrastructure 1414

Processor 1402

Memory 1406

Display device 1404

User interface device 1411

SYSTEMS AND METHODS FOR AN INSTANT VIRTUAL ACCESS POINT

TECHNICAL FIELD

The present invention generally relates to wireless virtual access points (VAP).

BACKGROUND

Many access points only offer open and unsecured communications. Some users, however, may wish to engage in communications or transactions that involve personal, sensitive, or proprietary information that is not necessarily suited for an open and unsecured communications network. As such, users may wish for such transactions to be conducted in a secure manner, so that this type of information may not be exposed or stolen.

A virtual access point (VAP) is a software-created access point that runs on a physical access point (AP). It allows a single AP to appear as multiple APs to wireless clients. Each VAP can have its own unique SSID, security settings, and virtual local area network (VLAN) assignment.

Implementing security features may be complicated, difficult to maintain, and can require a high level of technical knowledge. Pre-shared key (PSK)-based security systems require that a secret be entered into all station devices using the network. A PSK-based system relies on a secret shared between and stored at both the client station and the access point. The secret may be, for example, a long-bit stream, such as a passphrase, a password, a hexadecimal string, or the like. Used by a client station and the access point to authenticate each other, the secret may also be used to generate an encryption key set.

A third party that shares the same VAP or knows the PSK, can easily get the encryption key set used by the stations and use it to decipher any data between the station and the AP.

SUMMARY

Embodiments disclosed herein provide systems and methods for secure network access based on PSKs and passwords for a VAP. One embodiment provides one or more instant virtual access points (iVAP) in a network of wireless devices including an access point (AP) and wireless stations, wherein connections are based on different pre-shared keys (PSK) among the station devices. One embodiment provides a method for secure network access via one or more access points, comprising setting, one or more virtual access points (VAP) with a hidden SSID configuration, providing at least one hidden VAP; defining, for each hidden VAP one or more instant virtual access points (iVAP) as one or more sets of: SSID, passphrase, BSSID and VLAN, where the BSSID is unique, where iVAP sets maybe added, deleted or modified without change to the VAPs; transmitting periodic decoy beacons, with each SSID of the one or more iVAPs, wherein one or more decoy beacons use the same BSSID address of one of the hidden VAPs and one or more other decoy beacons use the same BSSID address of one of the one or more iVAPs; receiving, by one of the one or more APs, a probe request for the instant network secure access, from a requesting station device, within range of the one of the one or more APs, wherein if the probe request is a broadcast (wildcard) probe request, then first, answer the probe request with decoy probe responses including SSIDs and BSSIDs of defined iVAPs and second, answer the probe request with one or more decoy probe responses including SSIDs of the defined iVAPs and with a same BSSID as one of the hidden VAPs, where, if the probe request is a unicast probe request with a SSID defined by the one or more iVAPs, SSID1, then sending a probe response with SSID1 and the same BSSID as the hidden VAP, forcing a connection to the hidden VAP.

The method further includes verifying, by the hidden VAP, the SSIDs relative to the defined iVAPs during an association process; and calculating PSKs and message integrity codes (MICs) identifying a matching pre-shared key (PSK) between one of the one or more iVAPs and the requesting station device by executing, by the VAP, a 4-way handshake to verify message integrity code (MIC) based on pre-shared keys (PSKs) derived from at least one defined iVAP set; identifying further the VLAN used by the instant network secured access as a VLAN ID defined in the iVAP set used in the 4-way handshake; and authorizing, by the hidden VAP, the instant secure network access between the requesting station device and the hidden VAP.

Other embodiments may include one or more of the following features. The method where the probe request is sent (transmitted) via an open communication network associated with one of one or more iVAPs and concerning access to a secured communication network associated with one of the one or more iVAPs. The iVAP sets in one or more APs are defined by one or more access controllers, wherein the one or more access controllers can create, delete, and edit the iVAP sets in the one or more APs without changing VAP settings, and without disconnections. The VAP settings usually include the iVAP settings (e.g., SSID, passphrase, etc.). Separating the settings from the VAP into a few iVAPs, allows adding, deleting, or changing, of the iVAP setting without changing the VAP settings. Changing the VAP settings usually may disconnect the devices. One or more VAPs may delete the iVAP based on a timer, and one or more access controller sets, unsets, and changes with the timer for each iVAP. In the hidden SSID configuration, the SSID is hidden in beacon frames and not in decoy probe frames. An AP configures one or more hidden VAPs that support defined iVAP sets, and where the AP also configures one or more VAPs that do not support defined iVAP sets. The decoy beacons may use multi-basic service set (multi-BSS) elements to include multiple iVAPs SSID and BSSIDs in a single beacon frame. When the probe request is a broadcast (wildcard) probe request, the decoy probe responses are generated to ensure a plurality of SSIDs that are used over the same hidden VAP. During association, the requesting station device sends the SSID to which they are trying to connect, and then a selected iVAP verifies the SSID against the defined iVAP sets.

The method may further include: avoiding sending decoy beacons and decoy probe responses and expecting the station device to predict one of the SSIDs defined in the iVAP sets. The 4-way handshake allows a selected iVAP and the requesting station device to mutually determine that they each have the same PSK without sending the actual PSK to each other. The 4-way handshake includes a message sent from the requesting station device to the VAP, containing a supplicant nonce (SNONCE) and the message integrity code (MIC) to prove possession of a pairwise transit key (PTK) which is derived from the PSK, where, an iVAP process calculates the PSK and the MIC of each defined iVAP matching the SSID, that the requesting station device is connected with (using a different passphrase), and the hidden VAP compares a calculated MIC with a requesting station device's MIC to determine which of the PSKs the requesting station device used, and if none of the MICs matches, then the hidden VAP disconnects the requesting station device, if the hidden VAP does match one of the MICs, then this matching PSK is used for future steps with the requesting station device. If the defined iVAP set was found to match with the PSK of a connecting station device, then the VLAN ID of that iVAP set is used for communication of the connecting station device with a wired network. Implementations of the described techniques may include hardware, a method or process, or computer software on a computer-accessible medium.

Another embodiment includes a non-transitory computer-readable storage medium having program instructions stored thereon that implement the methods and embodiments disclosed herein.

A method for providing instant network secure access may include: performing, via one or more Access Points (AP): setting, one or more virtual access points (VAP) with a hidden SSID configuration, providing at least one hidden VAP; defining, for each hidden VAP one or more instant virtual access points (iVAP) as one or more sets of: SSIDs, passphrases, BSSIDs and VLANs; where the BSSID may be unique, and where iVAP sets may be added, deleted, or modified without change to the VAPs; transmitting periodic decoy beacons, with each SSID of the one or more iVAPs, where, one or more decoy beacons use the same BSSID addresses of one of the hidden VAPs and one or more other decoy beacons use the same BSSID addresses of the one or more iVAPs; receiving, by the one or more APs, a probe request for instant network secure access, from a requesting station device, within range of the one or more APs, where, if the probe request may be a broadcast probe request, then answering the probe request with one or more decoy probe responses including SSIDs and BSSIDs of defined iVAPs and answering the probe request with one or more decoy probe responses including the SSIDs of the defined iVAPs and with a same BSSID as one of the hidden VAPs, where, if the probe request may be a unicast probe request with an SSID defined by one or more iVAPs, SSID1, then transmitting a probe response with SSID1 and the same BSSID as the hidden VAP; verifying, by the hidden VAP, the SSIDs relative to the defined iVAPs during an association process; and calculating pre-shared keys (PSKs) and message integrity codes (MICs); identifying a matching pre-shared key (PSK) between one of the one or more iVAPs and the requesting station device by executing, by the VAP, a 4-way handshake to verify the message integrity code (MIC) based on the pre-shared keys (PSKs) derived from at least one defined iVAP set; identifying further the VLAN used by the instant network secured access as a virtual local area network (VLAN) id defined in the iVAP set used in the 4-way handshake; and authorizing, by the hidden VAP, the instant secure network access between the requesting station device and the hidden VAP.

In additional method embodiments, the probe request may be sent via an open communication network associated with the one or more iVAPs and concerning access to a secured communication network associated with the one or more iVAPs. In additional method embodiments, the iVAP sets in the one or more APs may be defined by one or more access controllers, and where, the one or more access controllers create, delete, and edit the iVAP sets in the one or more APs without changing VAP settings and without disconnections.

In additional method embodiments, the one or more VAPs delete a selected iVAP based on a timer, and where, one or more access controllers sets, unsets and changes the timer for each iVAP. In additional method embodiments, in the hidden SSID configuration, the SSID may be hidden in beacon frames and not in decoy probe frames. In additional method embodiments, one of the one or more APs configures one or more hidden VAPs that support defined iVAP sets, and where the one of the one or more APs also configures one or more VAPs that do not support defined iVAP sets.

In additional method embodiments, the decoy beacons use multi-bss elements to include multiple iVAPs, SSIDs, and BSSIDs in a single beacon frame. In additional method embodiments, when the probe request may be a broadcast ("wildcard") probe request, "decoy probe" responses may be generated to ensure a plurality of SSIDs that may be used over the same hidden VAP. In additional method embodiments, during association, the requesting station device sends the SSID to which they may be trying to connect, and then a selected iVAP verifies the SSID against the defined iVAP sets. Additional method embodiments may include: avoiding sending decoy beacons and decoy probe responses, expecting the station device to predict one of the SSIDs defined in the iVAP sets.

In additional method embodiments, the 4-way handshake allows a selected iVAP and the requesting station device to mutually determine that they each have the same PSK without sending the actual PSK to each other. In additional method embodiments, the 4-way handshake includes a message sent from the requesting station device to the VAP, containing a Supplicant Nonce (SNonce) and the MIC to prove possession of a pairwise transit key (PTK) which may be derived from the PSK, where, an iVAP algorithm calculates the PSK and then the MIC of each defined iVAP, matches the SSID the requesting station device may be connected with (using different passphrase), and where, the hidden VAP compares each calculated MIC with a requesting station device's MIC to determine which of the PSKs the requesting station device used, and where if none of the MICs matched, then the hidden VAP disconnects the requesting station device, where, if it did match one of the MICs then this matching PSK may be used for future steps with the requesting station device. In additional method embodiments, if the defined iVAP set was found to match with the PSK of a connecting station device, then the VLAN id of that iVAP set may be used for communication of the connecting station device with a wired network.

A non-transitory computer-readable storage medium embodiment may have program instructions stored thereon that, upon execution by one or more access points (AP), cause the one or more APs to provide instant network secure access: setting, one or more virtual access points (VAP) with a hidden SSID configuration, causing a hidden VAP; defining, for each hidden VAP one or more instant virtual access points (iVAP) as one or more sets of SSIDs, passphrases, BSSIDs and VLANs, where the BSSID may be unique, and where iVAP sets may be added, deleted, or modified without change to the VAPs; sending periodic decoy beacons, with each SSID of the one or more iVAPs, where, some of the decoy beacons use the same BSSID address of one of the hidden VAPs and some other decoy beacons use the same BSSID address of one of the one or more iVAPs; receiving, by one of the one or more APs, a probe request for the instant network secure access, from a requesting station device, within range of the one of the one or more APs, verifying, by the hidden VAP, the SSIDs relative to the defined iVAPs during an association process; and calculating pre-shared keys (PSKs) and message integrity codes (MICs); identifying a matching pre-shared key (PSK) between one of the one or more iVAPs and the requesting station device by executing, by the VAP, a 4-way handshake to verify the message integrity code (MIC) based on the pre-shared keys (PSKs) derived from at least one defined iVAP set; identifying further the VLAN used by the instant network secured access as a VLAN ID defined in the iVAP set used in the 4-way handshake; and authorizing, by the hidden VAP, the instant secure network access between the requesting station device and the hidden VAP.

In additional non-transitory computer-readable storage medium embodiments, after receiving by the one of the one or more APs the probe request for the instant network secure access from a requesting station device, where, if the probe request may be a broadcast ("wildcard") probe request, then first, answer the probe request with decoy probe responses including SSIDs and BSSIDs of defined iVAPs and second, answer the probe request with decoy probe responses including SSIDs of the defined iVAPs and with a same BSSID as one of the hidden VAPs, and where, if the probe request may be a unicast probe request with a SSID defined by the one or more iVAPs, SSID1, then send a probe response with SSID1 and the same BSSID as the hidden VAP.

In additional non-transitory computer-readable storage medium embodiments, the 4-way handshake allows a selected iVAP and the requesting station device to mutually determine that they each have the same PSK without sending the actual PSK to each other. In additional non-transitory computer-readable storage medium embodiments, the 4-way handshake includes a message sent from the requesting station device to the VAP, containing a Supplicant Nonce (SNonce) and the MIC to prove possession of a pairwise transit key (PTK) which may be derived from the PSK, where, an iVAP algorithm calculates the PSK and then the MIC of each defined iVAP matching the SSID the requesting station device may be connected with (using a different passphrase), and where, the hidden VAP compares each calculated MIC with a requesting station device's MIC to determine which of the PSKs the requesting station device used, and where if none of the MICs matched, then the hidden VAP disconnects the requesting station device, where, if it did match one of the MICs then this matching PSK may be used for future steps with the requesting station device. In additional non-transitory computer-readable storage medium embodiments, if the defined iVAP set was found to match with the PSK of a connecting station device, then the VLAN ID of that iVAP set may be used for communication of the connecting station device with a wired network.

In additional non-transitory computer-readable storage medium embodiments, the probe request may be sent via an open communication network associated with the one of the one or more iVAPs and concerning access to a secured communication network associated with the one of the one or more iVAPs.

A system embodiment for providing instant network secure access may include: one or more access points (AP) configured to implement a MAC Layer Management entity (MLME); an MLME Beacon comprising an iVAP Decoy Beacon; an MLME Probe comprising an iVAP Decoy Probe; an MLME Authentication; and an MLME Association, which comprises an iVAP SSID Checker.

BRIEF DESCRIPTION OF THE DRAWINGS

The components in the figures are not necessarily to scale, emphasis instead being placed upon illustrating the principles of the invention. Like reference numerals designate corresponding parts throughout the different views. Embodiments are illustrated by way of example and not limitation in the figures of the accompanying drawings, in which:

FIG. 4 depicts a timing diagram for a 4-way handshake which supports providing secured network access at an access point (AP), according to some embodiments.

FIG. 6 shows a flowchart of a process according to another embodiment disclosed herein.

DETAILED DESCRIPTION

Figure 1:
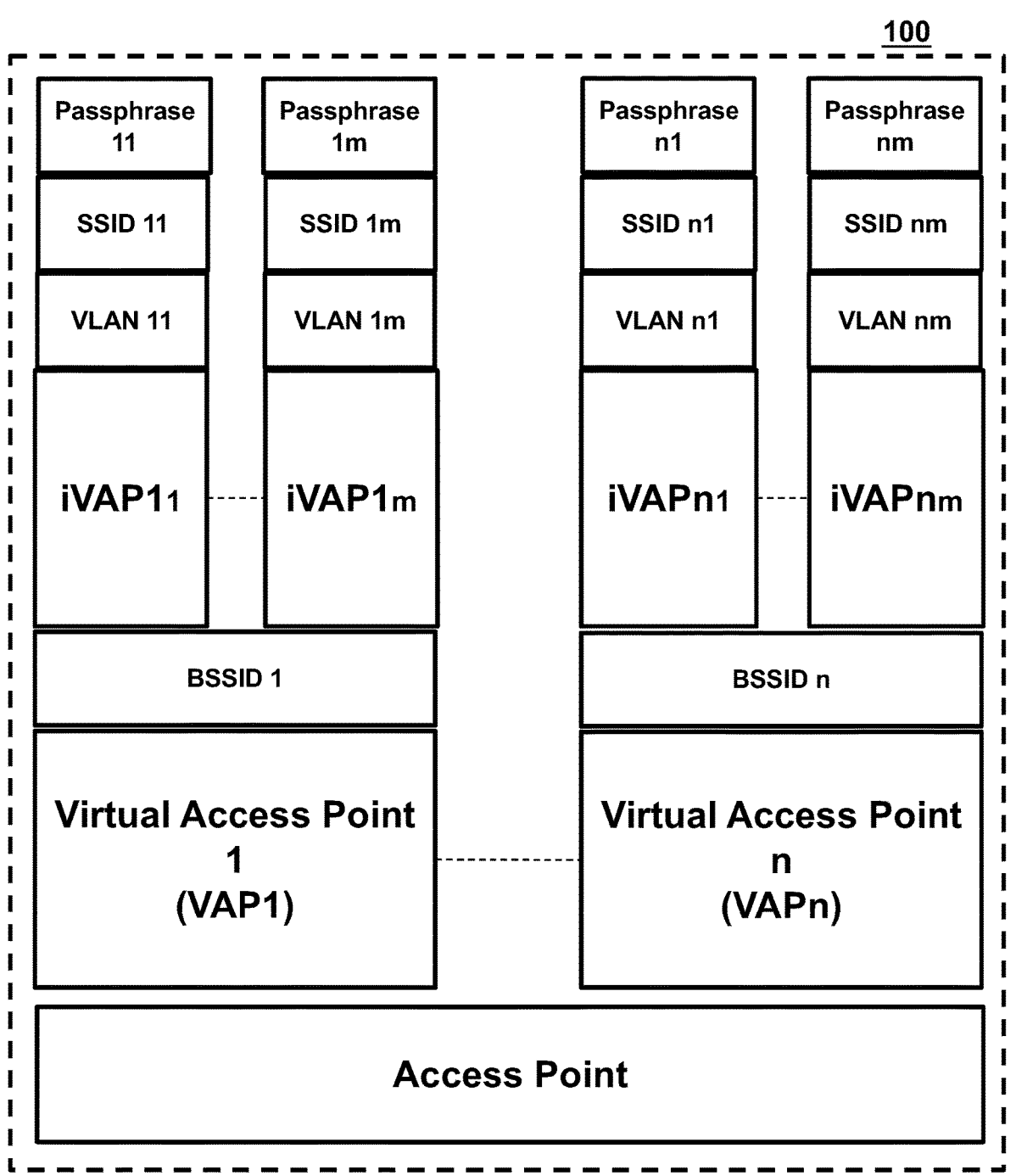
FIG. 1 illustrates an Access Point with n VAPs and (n×m) instant VAPs (iVAPs), according to some embodiments.

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Embodiments disclosed herein provide systems and methods for secure network access based on PSKs and passwords for a virtual access point (VAP). A VAP is a software-created access point that runs on a physical access point (AP). It allows a single AP to appear as multiple APs to wireless clients. Each VAP can have its own unique BSSID (Basic Service Set Identifier), security settings, and virtual local area network (VLAN) assignment. VAPs are commonly used in wireless networking to provide multiple wireless networks or SSIDs (Service Set Identifiers) that share the same physical hardware infrastructure. Each VAP can operate as if it were a separate physical access point, allowing for the segmentation of wireless clients and network traffic. VAPs are often used to segment wireless networks into different broadcast domains, such as for guests, employees, or different departments. They can also be used to provide different levels of security or performance for different types of devices.

Embodiments disclosed herein provide systems and methods for secure network access based on PSKs and passwords for a VAP. One embodiment provides a method for secure network access via one or more access points (AP), comprising: setting, one or more virtual access points (VAP) with a hidden SSID configuration, providing at least one hidden VAP; defining, for each hidden VAP one or more instant virtual access points (iVAP) as one or more sets of: SSID, passphrase, BSSIDs and VLAN, where the BSSID is unique; where iVAP sets maybe added, deleted or modified without change to the VAPs; transmitting periodic decoy beacons, with each SSID of the one or more iVAPs, wherein one or more decoy beacons use the same BSSID address of one of the hidden VAPs and one or more other decoy beacons use the same BSSID address of one of the one or more iVAPs; receiving, by one of the one or more APs, a probe request for the instant network secure access, from a requesting station device, within range of the one of the one or more APs, wherein if the probe request is a broadcast (wildcard) probe request, then first, answer the probe request with decoy probe responses including SSIDs and BSSIDs of defined iVAPs and second, answer the probe request with one or more decoy probe responses including SSIDs of the defined iVAPs and with a same BSSID as one of the hidden VAPs, where, if the probe request is a unicast probe request with a SSID defined by the one or more iVAPs, SSID1, then sending a probe response with SSID1 and the same BSSID as the hidden VAP, forcing a connection to the hidden VAP.

The method further includes verifying, by the hidden VAP, the SSIDs relative to the defined iVAPs during an association process; and calculating PSKs and message integrity codes (MICs) identifying a matching pre-shared key (PSK) between one of the one or more iVAPs and the requesting station device by executing, by the VAP, a 4-way handshake to verify message integrity code (MIC) based on pre-shared keys (PSKs) derived from at least one defined iVAP set; identifying further the VLAN used by the instant network secured access as a VLAN ID defined in the iVAP set used in the 4-way handshake; and authorizing, by the hidden VAP, the instant secure network access between the requesting station device and the hidden VAP.

Other embodiments may include one or more of the following features. The method where the probe request is sent (transmitted) via an open communication network associated with one of the one or more iVAPs and concerning access to a secured communication network associated with one of the one or more iVAPs. The iVAP sets in one or more APs are defined by one or more access controllers, wherein the one or more access controllers can create, delete, and edit the iVAP sets in the one or more APs without changing VAP settings, and without disconnections. The VAP settings usually include the iVAP settings (e.g., SSID, passphrase, etc.). Separating the settings from the VAP into a few iVAPs, allows adding, deleting, or changing, of the iVAP setting without changing the VAP settings. Changing the VAP settings usually may disconnect the devices. One or more VAPs may delete the iVAP based on a timer, and one or more access controller sets, unsets, and changes with the timer for each iVAP. In the hidden SSID configuration, the SSID is hidden in beacon frames and not in decoy probe frames. An AP configures one or more hidden VAPs that support defined iVAP sets, and where the AP also configures one or more VAPs that do not support defined iVAP sets. The decoy beacons may use multi-basic service set (multi-BSS) elements to include multiple iVAPs SSID and BSSIDs in a single beacon frame. When the probe request is a broadcast (wildcard) probe request, the decoy probe responses are generated to ensure a plurality of SSIDs that are used over the same hidden VAP. During association, the requesting station device sends the SSID to which they are trying to connect, and then a selected iVAP verifies the SSID against the defined iVAP sets.

The decoy beacons may use multi-BSS elements to include multiple iVAPs, SSIDs, and BSSIDs in a single beacon frame. When the probe request is a broadcast (wildcard) probe request, decoy probe responses are generated to ensure a plurality of SSIDs that are used over the same hidden VAP. During association, the requesting station device sends the SSID to which they are trying to connect, and then a selected iVAP verifies the SSID against the defined iVAP sets.

The method may further include avoiding sending decoy beacons and decoy probe responses and expecting the station device to predict one of the SSIDs defined in the iVAP sets. The 4-way handshake allows a selected iVAP and the requesting station device to mutually determine that they each have the same PSK without sending the actual PSK to each other. According to one embodiment, the 4-way handshake includes a message sent from the requesting station device to the VAP, containing a supplicant nonce (SNONCE) and the message integrity code (MIC) to prove possession of a pairwise transit key (PTK) which is derived from the PSK, wherein an iVAP process calculates the PSK and the MIC of each defined iVAP matching the SSID, that the requesting station device is connected with (using a different passphrase), and the hidden VAP compares a calculated MIC with a requesting station device's MIC to determine which of the PSKs the requesting station device used, and if none of the MICs matches, then the hidden VAP disconnects the requesting station device, and if the hidden VAP does match one of the MICs, then this matching PSK is used for future steps with the requesting station device. If the defined iVAP set was found to match with the PSK of a connecting station device, then the VLAN ID of that iVAP set is used for communication of the connecting station device with a wired network.

Another embodiment provides systems and methods for secured network access at an instant VAP (iVAP). An iVAP can comprise a virtual access point (VAP) with some additional features as will be described herein. For an instant VAP (iVAP) system, each station that desires to connect to the iVAP may use a different PSK. The unique PSK may allow the VAP and the station device to obtain a secured channel without other station devices that are connected to the VAP decrypting the data.

Relative to a VAP, a station device located within the transmission range of the VAP initiates a request to be sent via an open communication network associated with the VAP. The request concerns secured network access at the VAP by the station device. In response, a unique pre-shared key is generated for the station device based on information in the received request and transmitted over the open communication network for display on a webpage accessible to the station device. The unique pre-shared key is also stored in association with information regarding the station device. The station device may then use the unique pre-shared key in subsequent requests for secured network access. In some embodiments, a VAP may be referred to herein as a "hotspot". In some embodiments, a station device (STA) may be referred to herein as a "station", or a "user device". In one embodiment, communications (e.g., transmit, send, receive) between the devices comprise one or more of: via wireless communication and wired communication. Further embodiments are described hereinbelow in relation to the figures.

FIG. 1 illustrates an Access Point 100 (AP 100) with n VAPs and (n×m) instant VAPs (iVAPs), wherein n is an integer greater than one, according to some embodiments. In one embodiment, the Access Point 100 comprises Virtual Access Point 1 (VAP1) and Virtual Access Point n (VAPn). VAP1 comprises BSSID 1, which supports m iVAPs including iVAP1$_1$ to iVAP1$_m$, wherein m is an integer greater than one. Accordingly, iVAP1$_1$ supports VLAN 11, SSID 11 and Passphrase 11. Similarly, iVAP1$_m$ supports VLAN 1$_m$, SSID 1$_m$ and Passphrase 1$_m$. In a similar manner, VAPn comprises BSSID n, which supports m iVAPs including iVAPn$_1$ to iVAPn$_m$. Each of these iVAPs have corresponding element, iVAPn$_1$: VLAN n1, SSID n1 and Passphrase n1, and iVAP$_{nm}$: VLAN$_{nm}$, SSID$_{nm}$ and Passphrase$_{nm}$. The functions of access points, VAPs, iVAPs, BSSIDs, VLANs, SSIDs and passphrases are subsequently discussed.

Figure 2:
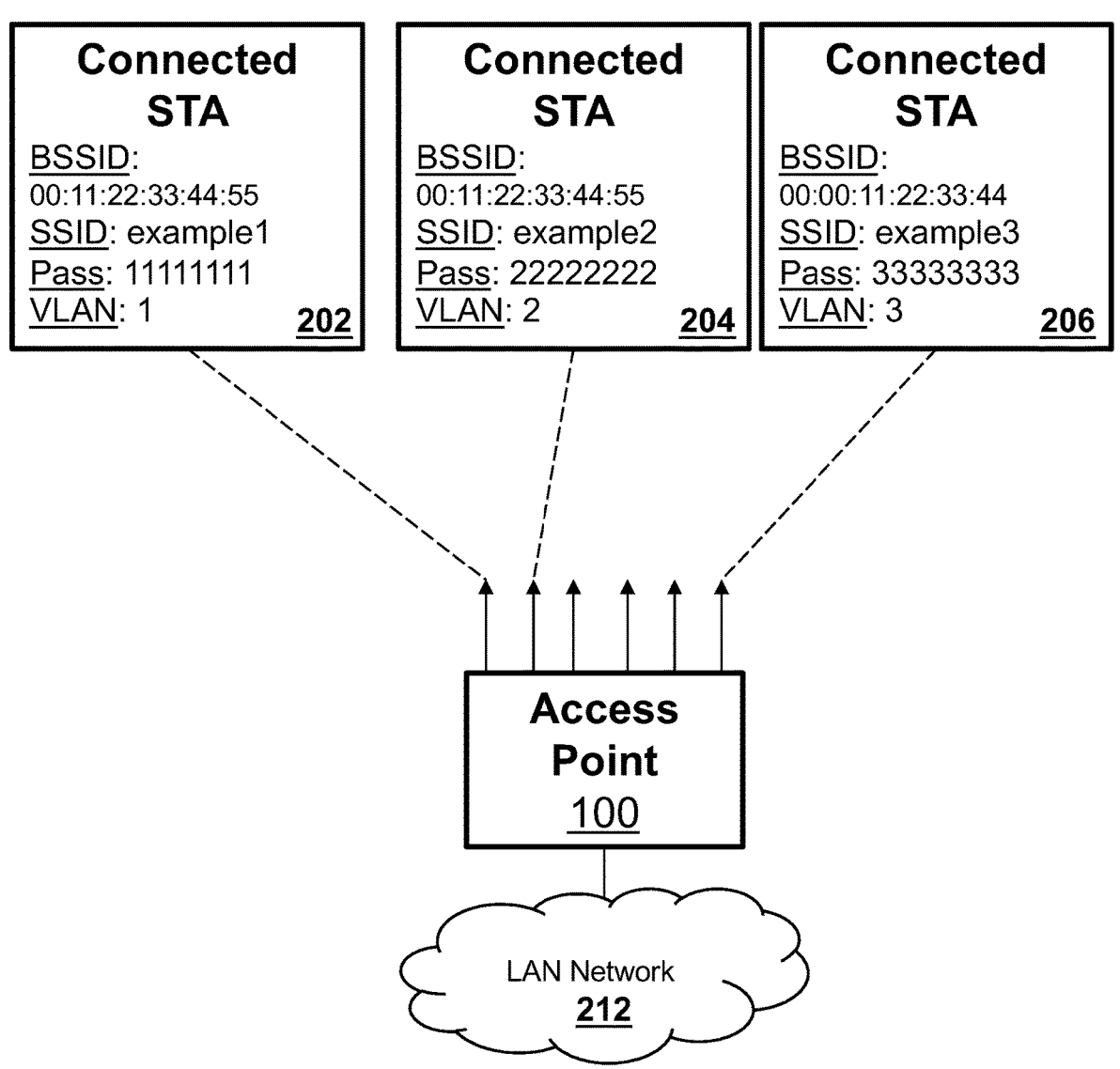
FIG. 2 illustrates an example for an Access Point with several iVAPs with three connected stations, where only an iVAP setup allows same BSSID as well as different SSID, Passphrase and VLAN (as shown in the left two STA), according to some embodiments.

FIG. 2 illustrates an example network 200 according to one embodiment, wherein the network 200 includes an Access Point 100 with several iVAPs and three connected stations (STAs), wherein only an iVAP setup allows the same BSSID as well as a different SSID, Passphrase, and VLAN (shown in STA 202 and STA 204), according to some embodiments. As illustrated, the network 200 includes a LAN network 212 that is coupled to the Access Point 100, wherein the Access Point 100 includes multiple outputs. Three of the outputs are coupled to separate iVAPs comprising a first iVAP as Connected STA 202, a second iVAP as Connected STA 204, and a third iVAP as Connected STA 206 (as shows by dashed lines). Connected STA 202 and Connected STA 204 have the same BSSID, whereas Connected STA 206 has a different BSSID. The three iVAPs have different SSIDs, pass (passphrases), and VLAN information.

Figure 3:
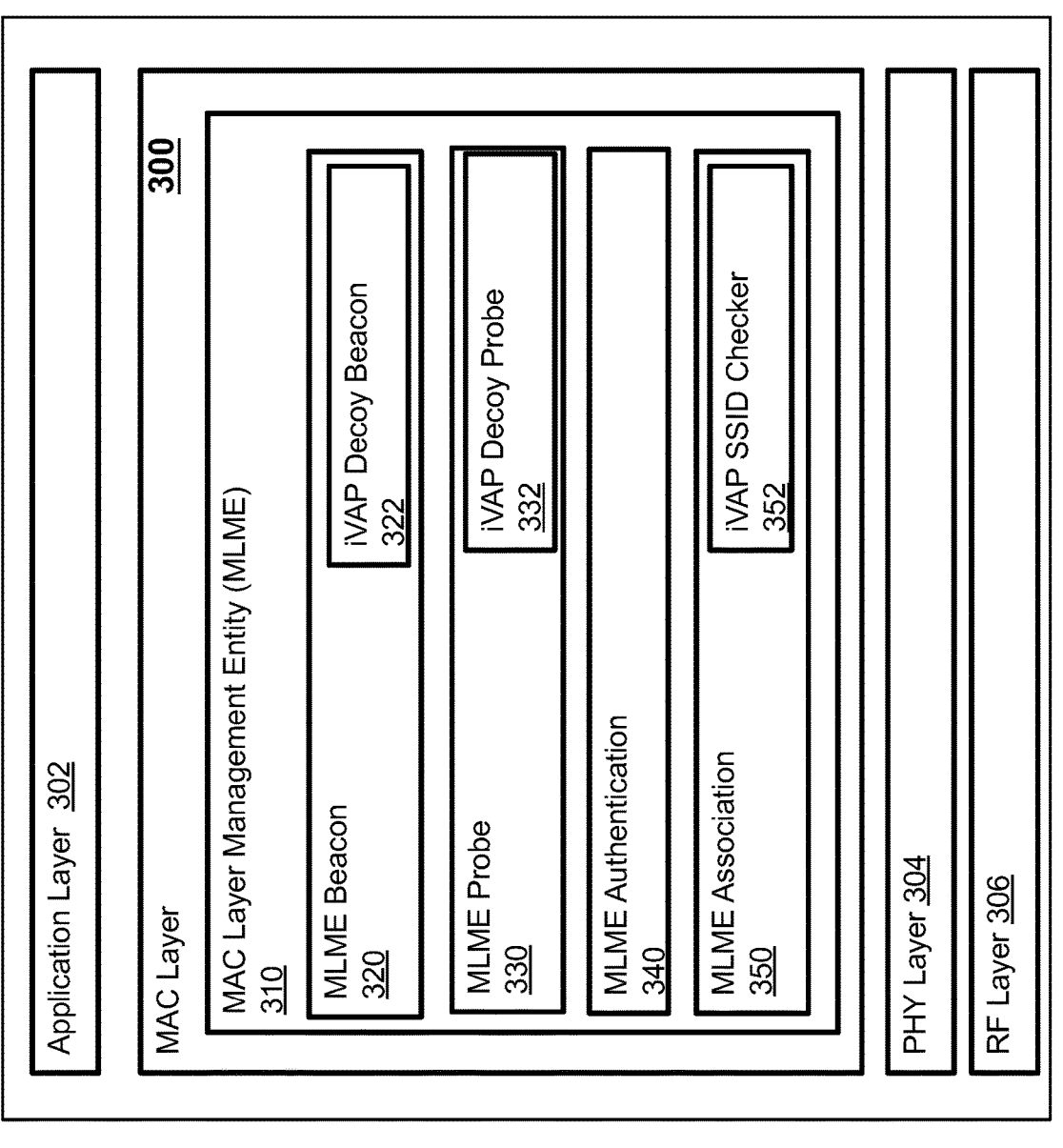
FIG. 3 depicts an example of a MAC Layer Management entity (MLME), according to some embodiments.

FIG. 3 depicts an example IEEE 802.11 wireless device comprising an Application Layer 302, a MAC Layer 300, a PHY Layer 304, and an RF Layer 306, according to an embodiment disclosed herein. In one embodiment, one or more of the devices in the network 200 in FIG. 2 include the MAC Layer 300. In one embodiment, the MAC Layer 300 includes a MAC Layer Management Entity (MLME) 310. Per IEEE 802.11, the MAC layer comprises two major functional entities: the "MAC sublayer" and the "MAC layer management entity (MLME)". The core functions of channel access, retransmissions, packet fragmentation, and encryption are handled by the MAC sublayer. "MLME" is the management entity where the Physical layer (PHY) MAC state machines reside. The MLME handles higher MAC functions such as synchronization, power management, and connection management, which includes association and authentication.

As depicted, in one embodiment the MLME 310 comprises four layers: (1) MLME Beacon 320, including iVAP Decoy Beacon 322, (2) MLME Probe 330, including iVAP Decoy Probe 332, (3) MLME Authentication 340 and (4) MLME Association 350, including iVAP SSID Checker 352. To implement the iVAP module, most changes are performed in MLME.

The functions of access points, VAPs, iVAPs, BSSIDs, VLANs, SSIDs and passphrases will now be further discussed.

In IEEE 802.11, incorporated herein by reference, a pre-shared key (PSK) is the key that is used in a handshake between the station devices and the access point (AP) device to generate a temporal key (TK) used for encryption of the wireless unicast frames. The PSK is derived from a combination of the passphrase and the network name (SSID). PSK may be defined as follows: PSK=PBKDF2 (HMAC-SHA1, Passphrase, SSID, 4096,256), wherein: the passphrase is the input password; the SSID acts as the salt for the system; the function iterates 4096 times (this iteration count is fixed for WPA/WPA2); and the output is a 256-bit key, which is the PSK.

The Wi-Fi family of wireless network protocols utilizes the IEEE802.1x protocol to provide each wireless station with a unique PSK. This protocol has overhead, and it may be more complicated for users to connect to the network.

A Service Set Identifier (SSID) is a 32-character unique identifier that is attached to the header of packets sent over a Wireless Local Area Network (WLAN). The SSID acts as a password when a mobile wireless device attempts to connect to the Basic Service Set (BSS). The SSID differentiates one WLAN from another. In cryptography, salt is random data fed as an additional input to a one-way function that hashes data, a password, or a passphrase. Salting is a cryptographic process where a new salt is randomly generated for each password. The salt and the password are concatenated and fed to a cryptographic hash function. The output hash value is then stored with the salt in a database.

Stations that share the same PSK on the same VAP may know the transit key (TK) of each other and therefore they can decrypt data from each other. In an embodiment of an instant VAP (iVAP) disclosed herein, each station that needs to connect to the VAP may use a different PSK. The unique PSK can allow the AP and the station to obtain a secured channel without the other station on the VAP decrypting the data.

An embodiment of an iVAP disclosed herein can support both a unique passphrase (e.g., PSK) and an SSID. Probe manipulation techniques are utilized to execute the connection to a secure network, according to an embodiment disclosed herein. According to an embodiment, a method for providing secured network access at an access point may include the following steps. As referenced, an SSID list includes a list of SSIDs and a passphrase list, which may provide a matching passphrase for each SSID. The SSID list includes a list of SSIDs and a passphrase list may be referred to as "at least one defined iVAP set".

Executing a five-part VAP process according to an embodiment disclosed herein comprises the following five general steps. First, set the VAP with a hidden SSID configuration. The SSID may be hidden in beacons, causing a hidden VAP. Second, periodically send decoy beacons, including: send decoy beacons with the SSID in the SSID list and the same BSSID as the hidden VAP, and send decoy beacons with SSIDs in the SSID list and random decoy BSSIDs (different for each SSID).

Third, for each incoming probe request from a requesting station device: if the probe request is a broadcast ("wildcard") probe request, then: answer the probe response with the SSIDs in SSID list and the same BSSID as the hidden VAP, also answer the probe response with the SSIDs in the SSID list and random decoy BSSIDs (different for each SSID). If the probe request is a unicast probe request with SSID1, then: if the destination address is the VAP address (i.e., my address) or the broadcast address: answer the probe response with SSID1 and the same BSSID as the hidden VAP, forcing a connection to the hidden VAP; otherwise ignore.

Fourth, during association, verify the SSID against the SSID list. Communications in subsequent communication may be with the hidden VAP using its address. Fifth, during a 4-way handshake verify the MIC using the PSK derived from the SSID list and the passphrase list to find the matching PSK.

Step 3 above is further described in relation to the process 350 in FIG. 5, further below. The hidden VAP may be used for the actual network connection. Because it is hidden and a user device does not know its SSID, decoy beacons and decoy probe responses may be used to give the one VAP many optional names (SSIDs). For the unicast request, the answer is only with a hidden VAP BSSID, which may shift the station to connect to the hidden VAP.

The five-part VAP is further discussed below.

Part 1—Hidden SSID in beacons: By setting a hidden SSID, many stations can be connected to the same VAP without sharing the same SSID. In a traditional hidden SSID, the SSID may not appear in the network list and the station stations may have to know the SSID in advance. In an iVAP, the SSID is hidden in the beacon frames and not in the probe frames, so the SSID may appear in the network list.

Part 2—Decoy beacons: The beacon frames can be used for passive scans for networks in the area and fill the network list in the station devices with the SSIDs in the area. For passive scans, the station only needs to listen for some period of time to the beacon frames as all APs are required to send them periodically. To teach the station about the supported SSID, the AP can send a few beacon frames. Some station devices will only show SSIDs in the list that have a unique BSSID, therefore the AP will send some beacons as mentioned previously. Additionally, some stations will verify that the beacons with the BSSID of the hidden VAP and the SSID of the iVAP exist before trying to associate them to the hidden VAP, therefore the AP will send some beacons as mentioned in the next example.

Part 3—Decoy Probe Responses: The probe frames can be used to scan for networks in the area and fill the network list in the station devices with SSIDs in the area. The station usually sends a broadcast probe to ask APs to respond with their network information. To teach the station about the supported SSID, the AP can answer a few times, as previously described. Some stations may not add to their list network with a repeating BSSID address, so to overcome this issue, "decoy" probe responses are produced, as previously described, to include SSIDs in the list. Some stations may not connect to a BSSID that was not produced during the scan. Therefore, the AP may also send "decoy" probe responses with the same BSSID as the VAP. In other words, when the probe request is a broadcast ("wildcard") probe request, "decoy probe" responses are generated to ensure the plurality of station devices add to their list of network stations with a repeating BSSID address.

Once the user has chosen a network from the list, usually the station may send another unicast probe. If the unicast probe included one of the random iVAP's BSSID as a destination, the AP may ignore the frame forcing the station to either send the probe as a broadcast destination or with the hidden VAP BSSID as a destination. In this case, the AP may answer the probe response with the SSID that was in the request and the same BSSID as the hidden VAP.

Part 4—Association and Authentication: After the decoy beacons and probes, the station may start an authentication and association process. During the association, the station may send the selected SSID to which it is trying to connect. The AP may verify the SSID against the SSIDs in the iVAP list. After the decoy beacons and probes, the station may start an authentication and association process. During the association, the station may send the selected SSID for which it is trying to connect. The AP may verify the SSID against the SSIDs in the iVAP list. After the decoy beacons and probes, the station may start an authentication and association process. During the association, the station may send the selected SSID to which it is trying to connect. The AP may verify the SSID against the SSIDs in the iVAP list.

Part 5: 4-way handshake. According to one embodiment, the 4-way handshake comprises a process where the station and the AP may prove to each other that they know the same PSK without sending the actual PSK to each other. Then, they may trust each other and may use the TK for symmetric encryption.

FIG. 4 depicts a timing diagram 400 showing timing of steps for a 4-way handshake for secured network access at the AP, according to some embodiments. The sequence of messages for the 4-way handshake may be as follows: At step 402, a Message 1 packet is transmitted from the AP 100 to the station device 210, wherein Message 1 includes the Authenticator Nonce (ANonce). The station device 210 uses ANonce, along with its own Supplicant Nonce (SNonce), to generate a pairwise transit key (PTK). The station device 210 may represent one of the Connected STA (202, 204, 206; FIG. 2).

At step 404, a Message 2 packet is transmitted from the station device 210 to the AP 100, wherein Message 2 includes the Supplicant Nonce (SNonce) and the Message Integrity Code (MIC) to prove possession of the pairwise master key (PMK) which is derived from the PSK. Based on the associated SSID, an iVAP process calculates possible PSKs and MICs, then compares them with the station's MIC to determine to which iVAP the station device is connecting. If none of the PSKs match, then the AP 100 may disconnect the station device 210. If the AP 100 did match one of the MICs, then its PSK may be used in later steps with the station device 210. Message Integrity Code (MIC) may also be referred to herein as Message Integrity Check (MIC).

At step 406, a Message 3 packet is transmitted from the AP 100 to the station device 210, to confirm mutual possession of the PMK and to transfer a Group Temporal Key (GTK) encryption using the Key Encryption Key (KEK) from the derived pairwise transit key (PTK). Message 3 also contains a MIC generated by the AP. The station device 210 may confirm the MIC of the AP 100.

At step 408, a Message 4 packet is transmitted from the station device 210 to AP 100, wherein Message 4 comprises an acknowledgment receipt and MIC of the station device 210. In response, the AP 100 may set the VLAN configuration for the iVAP to be a dynamic VLAN for a station device.

A hidden VAP may be used for the actual network connection. Because it is hidden and a user device does not know the SSID of the hidden VAP, decoy beacons, and probe responses may be used to give the one VAP many optional names (SSIDs).

In other embodiments, implementations may include a non-transitory computer-readable storage medium having program instructions stored thereon. The non-transitory computer-readable storage medium also includes settings, one or more virtual access points (VAP) with a hidden SSID configuration, causing a hidden VAP; defining, for each hidden VAP one or more instant virtual access points (iVAP) as one or more sets of SSIDs, passphrases, BSSIDs and VLANs, where the BSSID is unique, and where iVAP sets are added, deleted, or modified without change to the VAPs; sending periodic decoy beacons, with each SSID of the one or more iVAP, where, some of the decoy beacons use the same BSSID address of one of the hidden VAPs and some other decoy beacons use the same BSSID address of one of the one or more iVAPs; receiving, by one of the one or more APs, a probe request for the instant network secure access, from a requesting station device, within range of one of the one or more APs, verifying, by the hidden VAP, the SSIDs relative to the defined iVAPs during an association process; and calculating pre-shared key (PSKs) and message integrity codes (MICs) identifying a matching pre-shared key (PSK) between one of the one or more iVAPs and the requesting station device by executing, by the VAP, a 4-way handshake to verify the message integrity code (MIC) based on the pre-shared keys (PSKs) derived from at least one defined iVAP set; identifying further the VLAN used by the instant network secured access as a VLAN ID defined in the iVAP set used in the 4-way handshake; and authorizing, by the hidden VAP, the instant secure network access between the requesting station device and the hidden VAP. Other embodiments of this aspect include corresponding computer systems, apparatuses, and computer programs recorded on one or more computer storage devices, each configured to perform the actions of the methods. The hidden VAP may be used for the actual network connection. Because it is hidden and a user does not know its SSID, decoy beacons and probe responses are used to give the one VAP many optional names (SSIDs).

In other embodiments, a method for providing instant network secure access comprises performing by one or more access points (AP): implementing a MAC Layer Management entity (MLME) comprising a MLME Beacon, which comprises an iVAP Decoy Beacon, and a MLME Probe, which comprises a iVAP Decoy Probe, wherein the MLME further comprises a MLME Authentication, and a MLME Association, which comprises iVAP SSID Checker.

Figure 5:
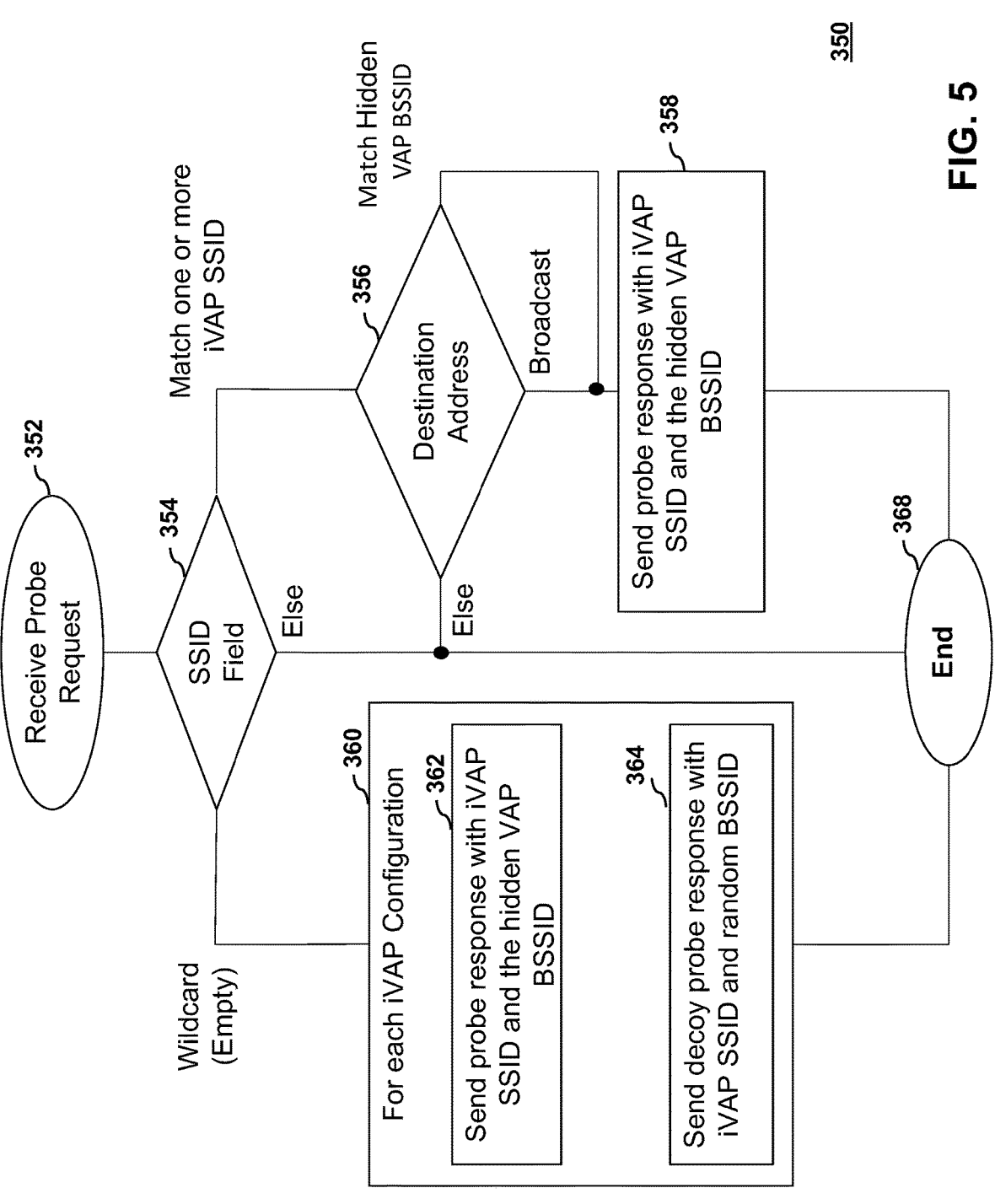
FIG. 5 shows a flowchart of a process employed in virtual access point operation, according to one embodiment.

FIG. 5 shows a flowchart of a process 350 employed in virtual access point operation, according to one embodiment. The process 350 includes: at step 352 receive probe request at from a requesting station; at step 354, if the SSID field in the probe is a broadcast (i.e., wildcard or empty) then proceed to step 360, if the SSID Field matches at least one iVAP SSID (the probe request is a unicast request) then proceed to step 356, otherwise proceed to step 368 and ignore.

At step 360, for each iVAP configuration: (i) at step 362 send a probe response (answer) with iVAP SSID and the hidden VAP BSSID, and (ii) at step 364 send the decoy probe response with an iVAP SSID and a random decoy BSSID, then proceed to step 368.

At step 356, if the SSID field in the probe matches that of a Hidden VAP BSSID or a broadcast address, then in step 358 send the probe response with an iVAP SSID and the BSSID of the hidden VAP, otherwise proceed to step 368 and ignore.

FIG. 6 shows a flowchart of a process 450, similar to process 350 in FIG. 5, according to another embodiment disclosed herein. The process 450 comprises the steps: Set a VAP with a hidden SSID, provide the hidden VAP (step 452); define, for each hidden VAP, an iVAP as a set of SSID, Passphrase, BSSID, and VLAN (step 454); transmit a periodic decoy beacon using the same BSSID address of the hidden VAP and the same BSSID address of the iVAP, with each SSID of the iVAP (step 456); answer the probe request with decoy probe responses for each iVAP (step 458); verify the SSID relative to defined the iVAP during the association process (step 460); calculate the PSK and MIC of each defined iVAP matching SSID that the requesting station device is connected with (step 462); identify the matching PSK between one of the iVAP and the requesting station device by executing 4-way handshake (step 464); identify the VLAN used by instant network secured access as a VLAN ID defined in an iVAP set used in a 4-way handshake (step 466); authorize instant network secured access between the requesting station device and the hidden VAP (step 468).

In one embodiment, instant access comprises access with reduced time delay rather than no time delay. In one embodiment, instant access comprises access with minimal time delay. In one embodiment, instant access comprises access within a predefined time delay. In one embodiment, instant access comprises access in an optimized time period. In one embodiment, instant access comprises essentially instant access.

Figure 7:
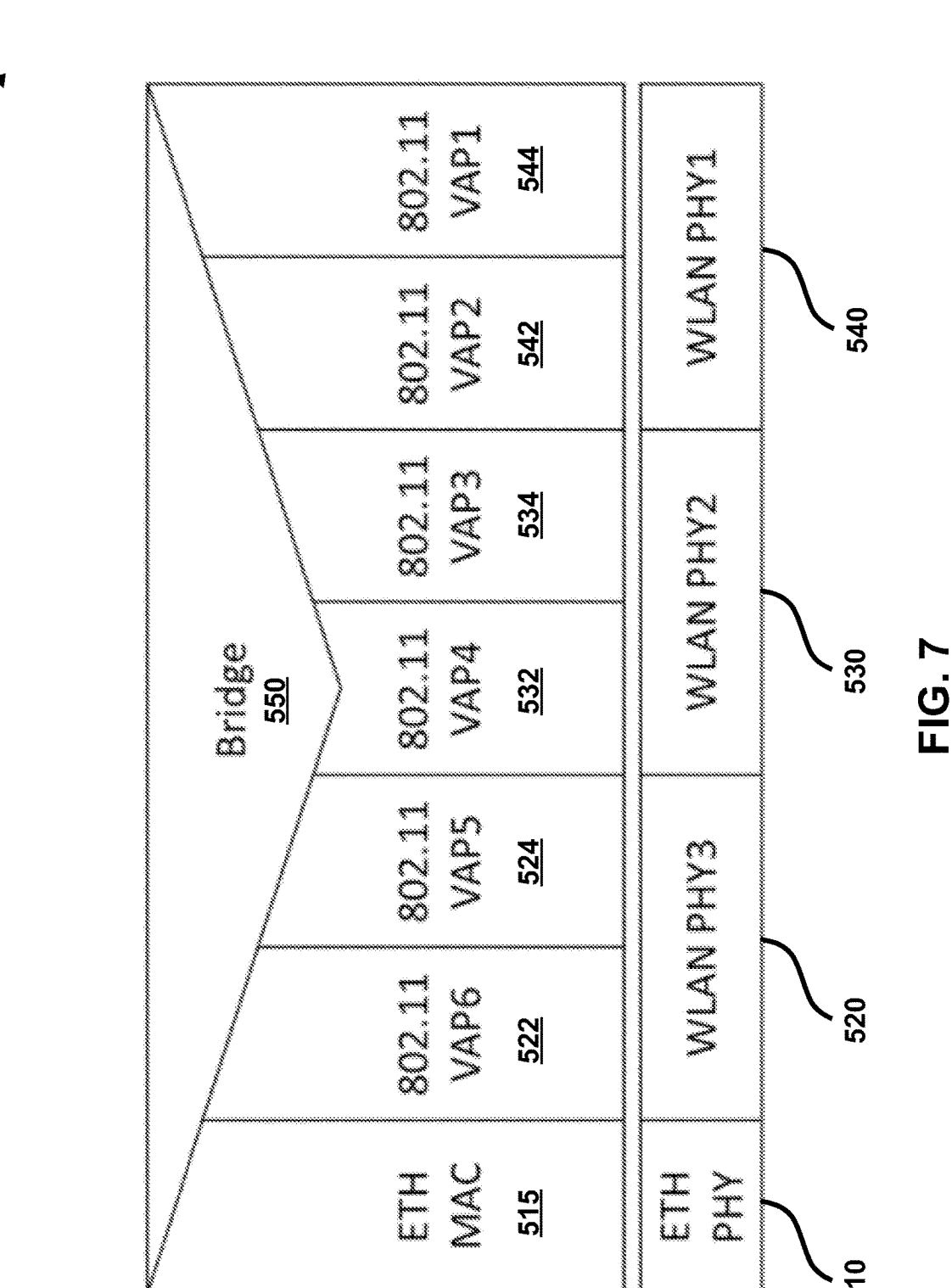
FIG. 7 depicts a conceptual illustration of an access point device layout.

With reference to FIG. 7, a conceptual illustration of an access point (AP) 500 device layout is shown. The AP 500 can include a physical Ethernet port 510 that connects the AP 500 to other devices such as a wireless controller (not shown). The physical Ethernet port 510 is associated with an Ethernet-based media access control (MAC) address 515. In one embodiment, each AP 500 may have a number of physical radios installed. By way of example, the embodiment illustrated in FIG. 7 has three physical radios for use in wireless local area networks (WLANs) and these radios are marked as WLAN PHY1 540, WLAN PHY2, 530 and WLAN PHY3, 520. Each physical radio 520, 530, 540 may transmit and receive wireless signals between the AP 500 and one or more user devices to communicate over a network. In a number of embodiments, the radios may utilize the Physical Layer of the 802.11 standard and can be configured to work on different channels in the 2.4 GHz and 5 GHz bands.

Physical WLAN radios can be configured to have multiple virtual access points (VAPs) per physical radio. Each VAP acts as a secondary or additional hotspot but can share a single radio between multiple VAPs. Each VAP must be configured with a unique basic service set identifier (BSSID) and may share the same service set identifier (SSID) to allow for multiple connection types and/or connection configuration rules. The embodiment illustrated in FIG. 5 is configured such that each of a plurality of VAPs 522, 524, 532, 534, 542, 544 utilizes the MAC layer of the 802.11 standard such that a multiple-channel architecture (MCA) is used. In an embodiment, a bridge 550 may be utilized to forward frames between all VAPs 522, 524, 532, 534, 542, 544 as well as the access point 500 Ethernet connection 510 via the Ethernet MAC 515. These connections may allow for the connection and communication between other client devices connected to the AP 500 and other external devices and networks including the Internet. In further additional embodiments, the bridge 550 can pass frames between interfaces according to the destination MAC address of the frames. The bridge 550 may contain a MAC table that can be dynamically filled according to a frame's source MAC address and the interface it came from.

According to one embodiment, a system of one or more computers or processors can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by a data processing apparatus, cause the apparatus to perform the actions, according to an embodiment of the processes disclosed herein.

Further, a non-transitory computer-readable storage medium may implement steps comprising: settings, one or more virtual access points (VAP) with a hidden SSID configuration, causing a hidden VAP; defining, for each hidden VAP one or more instant virtual access points (iVAP) as one or more sets of SSID, passphrase, BSSID and VLAN, where the BSSID is unique, and where iVAP sets are added, deleted or modified without change to the VAPs; sending periodic decoy beacons, with each SSID of the one or more iVAP, where, some of the decoy beacons use the same BSSID address of one of the hidden VAPs and some other decoy beacons use the same BSSID address of one of the one or more iVAPs; receiving, by one of the one or more APs, a probe request for the instant network secure access, from a requesting station device, within range of the one of the one or more APs, verifying, by the hidden VAP, the SSIDs relative to the defined iVAPs during an association process; and calculating pre-shared key (PSKs) and message integrity codes (MICs) identifying a matching pre-shared key (PSK) between one of the one or more iVAPs and the requesting station device by executing, by the VAP, a 4-way handshake to verify the message integrity code (MIC) based on pre-shared keys (PSKs) derived from at least one defined iVAP set; identifying further the VLAN used by the instant network secured access as a VLAN ID defined in the iVAP set used in the 4-way handshake; and authorizing, by the hidden VAP, the instant secure network access between the requesting station device and the hidden VAP. Other embodiments of this aspect include corresponding computer systems, apparatuses, and computer programs recorded on one or more computer storage devices, each configured to perform the actions of the methods disclosed herein.

Figure 8:
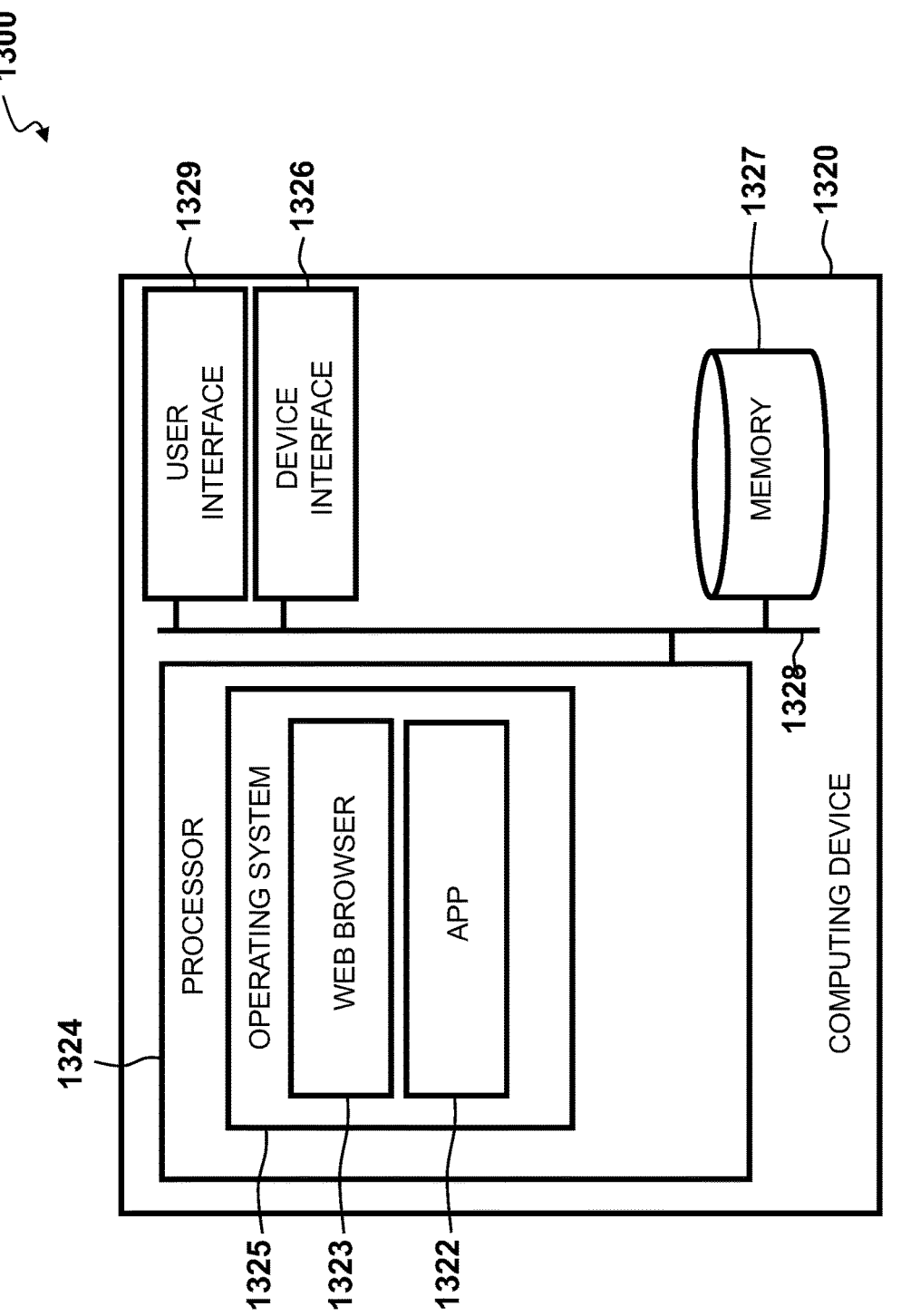
FIG. 8 illustrates an example top-level functional block diagram of a computing device embodiment.

FIG. 8 illustrates an example of a top-level functional block diagram of a computing device embodiment 1300. The example operating environment is shown as a comput-ing device 1320 comprising a processor 1324, such as a central processing unit (CPU), addressable memory 1327, an external device interface 1326, e.g., an optional universal serial bus port and related processing, and/or an Ethernet port and related processing, and an optional user interface 1329, e.g., an array of status lights and one or more toggle switches, and/or a display, and/or a keyboard and/or a pointer-mouse system and/or a touch screen. Optionally, the addressable memory may, for example, be flash memory, eprom, and/or a disk drive or other hard drive. These elements may be in communication with one another via a data bus 1328. In some embodiments, via an operating system 1325 such as one supporting a web browser 1323 and applications 1322, the processor 1324 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the trans-mitted message and the associated buyer computing device; and track movement of the registered buyer computing device in the accessed property via a viewer tracking com-ponent. Accordingly, the system may facilitate the tracking of buyers by the system and sellers once they are on the property and aid in the seller's search for buyers for their property. The figures described below provide more details about the implementation of the devices and how they may interact with each other using the disclosed technology.

Figure 9:
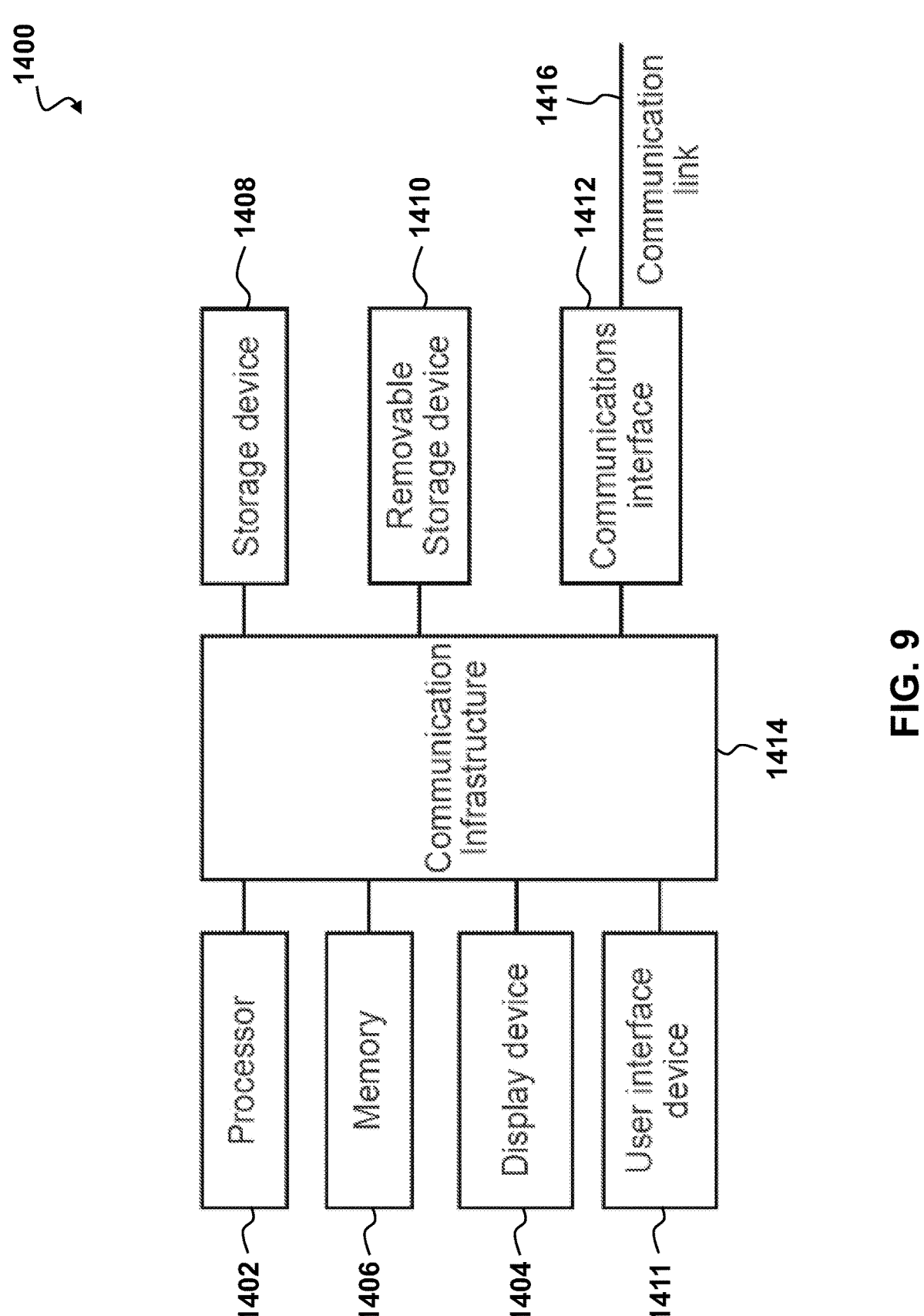
FIG. 9 shows a high-level block diagram and process of a computing system for implementing an embodiment of the system and process.

FIG. 9 is a high-level block diagram 1400 showing a computing system comprising a computer system useful for implementing an embodiment of the system and process, disclosed herein. Embodiments of the system may be imple-mented in different computing environments. The computer system includes one or more processors 1402, and can further include an electronic display device 1404 (e.g., for displaying graphics, text, and other data), a main memory 1406 (e.g., random access memory (RAM)), storage device 1408, a removable storage device 1410 (e.g., removable storage drive, a removable memory module, a magnetic tape drive, an optical disk drive, a computer readable medium having stored therein computer software and/or data), user interface device 1411 (e.g., keyboard, touch screen, keypad, pointing device), and a communication interface 1412 (e.g., modem, a network interface (such as an Ethernet card), a communications port, or a PCMCIA slot and card). The communication interface 1412 allows software and data to be transferred between the computer system and external devices. The system further includes a communications infrastructure 1414 (e.g., a communications bus, cross-over bar, or network) to which the aforementioned devices/modules are connected as shown.

Information transferred via the communications interface 1414 may be in the form of signals such as electronic, electromagnetic, optical, or other signals capable of being received by communications interface 1414, via a commu-nication link 1416 that carries signals and may be imple-mented using wire or cable, fiber optics, a phone line, a cellular/mobile phone link, a radio frequency (RF) link, and/or other communication channels. Computer program instructions representing the block diagram and/or flow-charts herein may be loaded onto a computer, programmable data processing apparatus, or processing devices to cause a series of operations performed thereon to produce a com-puter implemented process.

Embodiments have been described with reference to flowchart illustrations and/or block diagrams of methods, apparatus (systems) and computer program products accord-ing to embodiments. Each block of such illustrations/dia-grams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic-implementing embodiments. In alternative implementations, the functions noted in the blocks may occur out of the order noted in the figures, concurrently, etc.

Computer programs (i.e., computer control logic) are stored in main memory and/or secondary memory. Com-puter programs may also be received via a communications interface 1412. Such computer programs, when executed, enable the computer system to perform the features of the embodiments as discussed herein. In particular, the com-puter programs, when executed, enable the processor and/or multi-core processor to perform the features of the computer system. Such computer programs represent controllers of the computer system.

Figure 10:
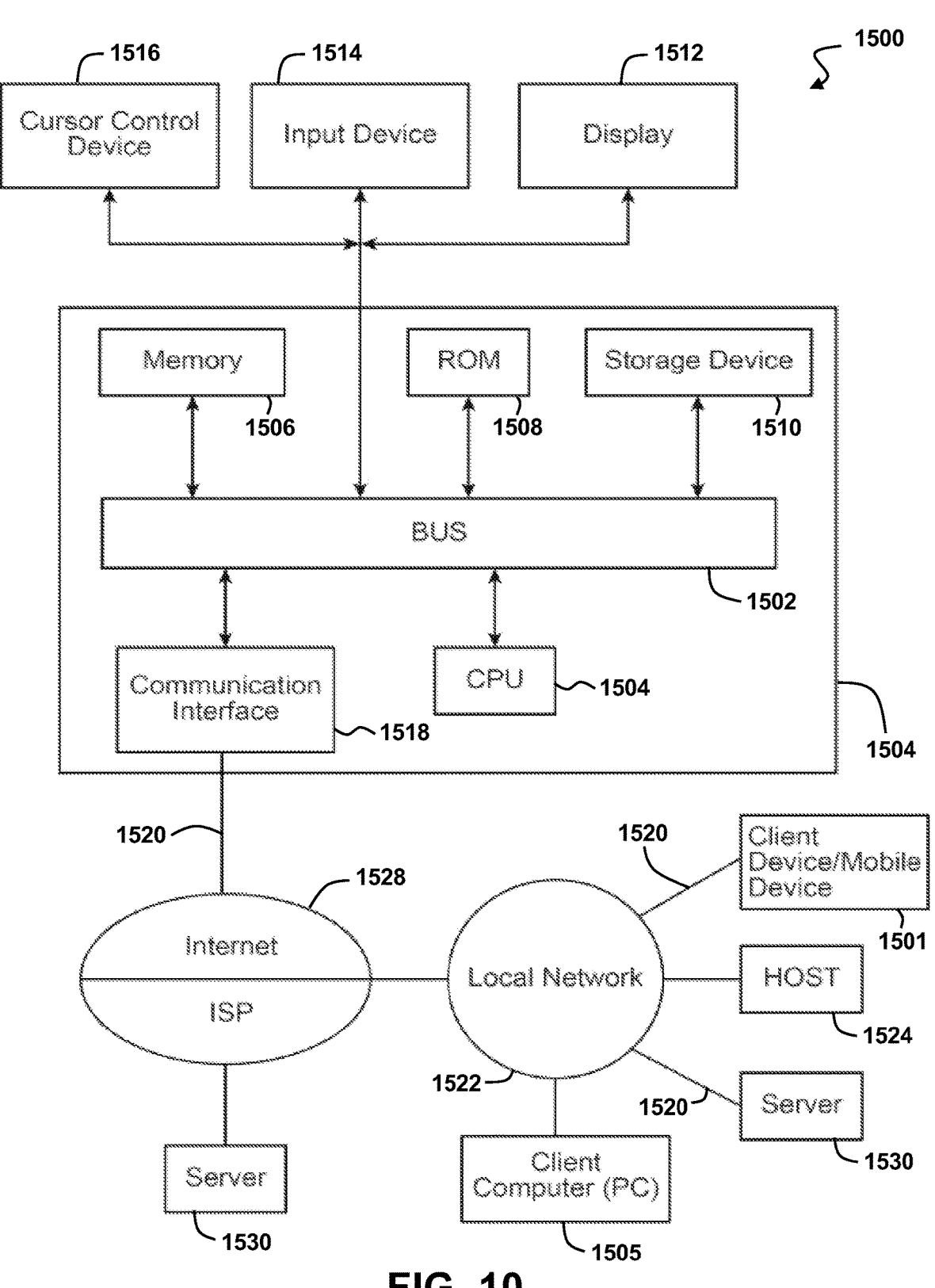
FIG. 10 shows a block diagram and process of an exemplary system in which an embodiment may be implemented.

FIG. 10 shows a block diagram of an example system 1500 in which an embodiment may be implemented. The system 1500 includes one or more client devices 1501 such as consumer electronics devices, connected to one or more server computing systems 1530. A server 1530 includes a bus 1502 or other communication mechanism for communicating information, and a processor (CPU) 1504 coupled with the bus 1502 for processing information. The server 1530 also includes a main memory 1506, such as a random-access memory (RAM) or other dynamic storage devices, coupled to the bus 1502 for storing information and instructions to be executed by the processor 1504. The main memory 1506 also may be used for storing temporary variables or other intermediate information during execution or instructions to be executed by the processor 1504. The server computer system 1530 further includes a read-only memory (ROM) 1508 or other static storage device coupled to the bus 1502 for storing static information and instructions for the processor 1504. A storage device 1510, such as a magnetic disk or optical disk, is provided and coupled to the bus 1502 for storing information and instructions. The bus 1502 may contain, for example, thirty-two address lines for addressing video memory or main memory 1506. The bus 1502 can also include, for example, a 32-bit data bus for transferring data between and among the components, such as the CPU 1504, the main memory 1506, video memory and the storage device 1510. Alternatively, multiplex data/address lines may be used instead of separate data and address lines.

The server 1530 may be coupled via the bus 1502 to a display 1512 for displaying information to a computer user. An input device 1514, including alphanumeric and other keys, is coupled to the bus 1502 for communicating information and command selections to the processor 1504. Another type or user input device comprises cursor control 1516, such as a mouse, a trackball, or cursor direction keys for communicating direction information and command selections to the processor 1504 and for controlling cursor movement on the display 1512.

According to one embodiment, the functions are performed by the processor 1504 executing one or more sequences of one or more instructions contained in the main memory 1506. Such instructions may be read into the main memory 1506 from another computer-readable medium, such as the storage device 1510. Execution of the sequences of instructions contained in the main memory 1506 causes the processor 1504 to perform the process steps described herein. One or more processors in a multi-processing arrangement may also be employed to execute the sequences of instructions contained in the main memory 1506. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer-readable medium", and "computer program product," are used to generally refer to media such as main memory, secondary memory, removable storage drive, a hard disk installed in hard disk drive, and signals. These computer program products are means for providing software for the computer system. The computer-readable medium allows the computer system to read data, instructions, messages or message packets, and other computer-readable information from the computer-readable medium. The computer-readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer-readable medium may comprise computer readable information in a transitory state medium such as a network link and/or a network interface, including a wired network or a wireless network that allows a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor which may be a multi-core processor to perform the features of the computer system. Accordingly, such computer programs represent controllers of the computer system.

Generally, the term "computer-readable medium" as used herein refers to any medium that participated in providing instructions to the processor 1504 for execution. Such a medium may take many forms, including but not limited to, non-volatile media, volatile media, and transmission media. Non-volatile media includes, for example, optical or magnetic disks, such as the storage device 1510. Volatile media includes dynamic memory, such as the main memory 1506. Transmission media includes coaxial cables, copper wire and fiber optics, including the wires that comprise the bus 1502. Transmission media can also take the form of acoustic or light waves, such as those generated during radio waves and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1504 for execution. For example, the instructions may initially be carried on a magnetic disk of a remote computer. The remote computer can load the instructions into its dynamic memory and send the instructions over a telephone line using a modem. A modem local to the server 1530 can receive the data on the telephone line and use an infrared transmitter to convert the data to an infrared signal. An infrared detector coupled to the bus 1502 can receive the data carried in the infrared signal and place the data on the bus 1502. The bus 1502 carries the data to the main memory 1506, from which the processor 1504 retrieves and executes the instructions. The instructions received from the main memory 1506 may optionally be stored on the storage device 1510 either before or after execution by the processor 1504.

The server 1530 also includes a communication interface 1518 coupled to the bus 1502. The communication interface 1518 provides a two-way data communication coupling to a network link 1520 that is connected to the worldwide packet data communication network now commonly referred to as the Internet 1528. The Internet 1528 uses electrical, electromagnetic, or optical signals that carry digital data streams. The signals through the various networks and the signals on the network link 1520 and through the communication interface 1518, which carry the digital data to and from the server 1530, are exemplary forms of carrier waves transporting the information.

In another embodiment of the server 1530, the communication interface 1518 is connected to a network 1522 via a communication link 1520. For example, the communication interface 1518 may be an integrated services digital network (ISDN) card or a modem to provide a data communication connection to a corresponding type of telephone line, which can comprise part of the network link 1520. As another example, the communication interface 1518 may be a local area network (LAN) card to provide a data communication connection to a compatible LAN. Wireless links may also be implemented. In any such implementation, the communication interface 1518 sends and receives electrical, electromagnetic, or optical signals that carry digital data streams representing various types of information.

The network link 1520 typically provides data communication through one or more networks to other data devices. For example, the network link 1520 may provide a connection through the local network 1522 to a host computer 1524 or to data equipment operated by an Internet Service Provider (ISP). The ISP in turn provides data communication services through the Internet 1528. The local network 1522 and the Internet 1528 both use electrical, electromagnetic, or optical signals that carry digital data streams. The signals through the various networks and the signals on the network link 1520 and through the communication interface 1518, which carry the digital data to and from the server 1530, are exemplary forms of carrier waves transporting the information.

The server 1530 can send/receive messages and data, including e-mail and program code, through the network, the network link 1520, and the communication interface 1518. Further, the communication interface 1518 can comprise a USB/Tuner and the network link 1520 may be an antenna or cable for connecting the server 1530 to a cable provider, satellite provider, or other terrestrial transmission system for receiving messages, data and program code from another source.

The example versions of the embodiments described herein may be implemented as logical operations in a distributed processing system such as the system 1500 including the servers 1530. The logical operations of the embodiments may be implemented as a sequence of steps executing in the server 1530, and as interconnected machine modules within the system 1500. The implementation is a matter of choice and can depend on the performance of the system 1500 implementing the embodiments. As such, the logical operations constituting said example versions of the embodiments are referred to for example, as operations, steps, or modules.

Similar to the server 1530 described above, a client device 1501 can include a processor, memory, storage device, display, input device, and communication interface (e.g., e-mail interface) for connecting the client device to the Internet 1528, the ISP, or LAN 1522, for communication with the servers 1530.

The system 1500 can further include computers (e.g., personal computers, computing nodes) 1505 operating in the same manner as client devices 1501, where a user can utilize one or more computers 1505 to manage data in the server 1530.

Figure 11:
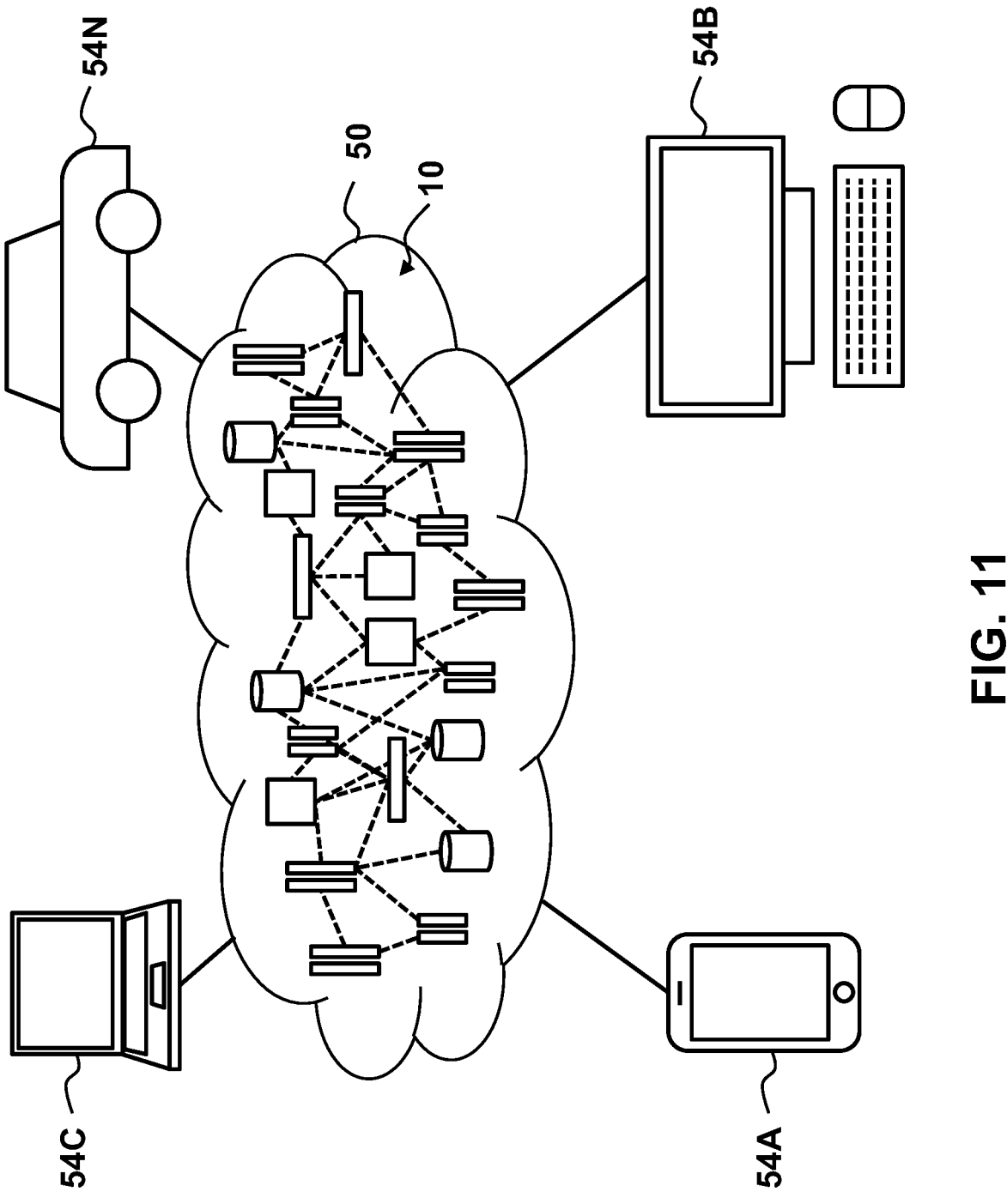
FIG. 11 depicts a cloud computing environment for implementing an embodiment of the system and process disclosed herein.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate.

The nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and a cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method for providing instant network secure access, the method comprising:
   performing, via one or more Access Points (AP):
   setting, one or more virtual access points (VAP) with a hidden SSID configuration, providing at least one hidden VAP;
   defining, for each hidden VAP one or more instant virtual access points (iVAP) as one or more sets of: SSIDs, passphrases, BSSIDs and VLANs;
   wherein the BSSID is unique, and wherein iVAP sets may be added, deleted, or modified without change to the VAPs;
   transmitting periodic decoy beacons, with each SSID of the one or more iVAPs, wherein, one or more decoy beacons use the same BSSID addresses of one of the hidden VAPs and one or more other decoy beacons use the same BSSID addresses of the one or more iVAPs;
   receiving, by the one or more APs, a probe request for instant network secure access, from a requesting station device, within range of the one or more APs,
      wherein, if the probe request is a broadcast probe request, then answering the probe request with one or more decoy probe responses including SSIDs and BSSIDs of defined iVAPs and answering the probe request with one or more decoy probe responses including the SSIDs of the defined iVAPs and with a same BSSID as one of the hidden VAPs,
      wherein, if the probe request is a unicast probe request with an SSID defined by one or more iVAPs, SSID1, then transmitting a probe response with SSID1 and the same BSSID as the hidden VAP;
   verifying, by the hidden VAP, the SSIDs relative to the defined iVAPs during an association process; and
   calculating pre-shared keys (PSKs) and message integrity codes (MICs);
   identifying a matching pre-shared key (PSK) between one of the one or more iVAPs and the requesting station device by executing, by the VAP, a 4-way handshake to verify the message integrity code (MIC) based on the pre-shared keys (PSKs) derived from at least one defined iVAP set;

identifying further the VLAN used by the instant network secured access as a virtual local area network (VLAN) id defined in the iVAP set used in the 4-way handshake; and authorizing, by the hidden VAP, the instant secure network access between the requesting station device and the hidden VAP.

2. The method of claim 1, wherein, the probe request is sent via an open communication network associated with the one or more iVAPs and concerning access to a secured communication network associated with the one or more iVAPs.

3. The method of claim 1, wherein the iVAP sets in the one or more APs are defined by one or more access controllers, and wherein, the one or more access controllers create, delete, and edit the iVAP sets in the one or more APs without changing VAP settings and without disconnections.

4. The method of claim 1, wherein the one or more VAPs delete a selected iVAP based on a timer, and wherein, one or more access controllers sets, unsets and changes the timer for each iVAP.

5. The method of claim 1, wherein, in the hidden SSID configuration, the SSID is hidden in beacon frames and not in decoy probe frames.

6. The method of claim 1, wherein, one of the one or more APs configures one or more hidden VAPs that support defined iVAP sets, and wherein the one of the one or more APs also configures one or more VAPs that do not support defined iVAP sets.

7. The method of claim 1, wherein, the decoy beacons use multi-bss elements to include multiple iVAPs, SSIDs, and BSSIDs in a single beacon frame.

8. The method of claim 1, wherein, when the probe request is a broadcast ("wildcard") probe request, "decoy probe" responses are generated to ensure a plurality of SSIDs that are used over the same hidden VAP.

9. The method of claim 1, wherein, during association, the requesting station device sends the SSID to which they are trying to connect, and then a selected iVAP verifies the SSID against the defined iVAP sets.

10. The method of claim 1, further comprising:

avoiding sending decoy beacons and decoy probe responses, expecting the station device to predict one of the SSIDs defined in the iVAP sets.

11. The method of claim 1, wherein, the 4-way handshake allows a selected iVAP and the requesting station device to mutually determine that they each have the same PSK without sending the actual PSK to each other.

12. The method of claim 11, wherein the 4-way handshake includes a message sent from the requesting station device to the VAP, containing a Supplicant Nonce (SNonce) and the MIC to prove possession of a pairwise transit key (PTK) which is derived from the PSK, wherein, an iVAP algorithm calculates the PSK and then the MIC of each defined iVAP, matches the SSID the requesting station device is connected with (using different passphrase), and wherein, the hidden VAP compares each calculated MIC with a requesting station device's MIC to determine which of the PSKs the requesting station device used, and wherein if none of the MICs matched, then the hidden VAP disconnects the requesting station device, wherein, if it did match one of the MICs then this matching PSK is used for future steps with the requesting station device.

13. The method of claim 11, wherein if the defined iVAP set was found to match with the PSK of a connecting station device, then the VLAN id of that iVAP set is used for communication of the connecting station device with a wired network.

14. A non-transitory computer-readable storage medium having program instructions stored thereon that, upon execution by one or more access points (AP), cause the one or more APs to provide instant network secure access:

setting, one or more virtual access points (VAP) with a hidden SSID configuration, causing a hidden VAP;

defining, for each hidden VAP one or more instant virtual access points (iVAP) as one or more sets of SSIDs, passphrases, BSSIDs and VLANs, wherein the BSSID is unique, and wherein iVAP sets are added, deleted, or modified without change to the VAPs;

sending periodic decoy beacons, with each SSID of the one or more iVAPs, wherein, some of the decoy beacons use the same BSSID address of one of the hidden VAPs and some other decoy beacons use the same BSSID address of one of the one or more iVAPs;

receiving, by one of the one or more APs, a probe request for the instant network secure access, from a requesting station device, within range of the one of the one or more APs, verifying, by the hidden VAP, the SSIDs relative to the defined iVAPs during an association process; and calculating pre-shared keys (PSKs) and message integrity codes (MICs)

identifying a matching pre-shared key (PSK) between one of the one or more iVAPs and the requesting station device by executing, by the VAP, a 4-way handshake to verify the message integrity code (MIC) based on the pre-shared keys (PSKs) derived from at least one defined iVAP set;

identifying further the VLAN used by the instant network secured access as a VLAN ID defined in the iVAP set used in the 4-way handshake; and authorizing, by the hidden VAP, the instant secure network access between the requesting station device and the hidden VAP.

15. The non-transitory computer-readable storage medium of claim 14, wherein after receiving by the one of the one or more APs the probe request for the instant network secure access from a requesting station device, wherein, if the probe request is a broadcast ("wildcard") probe request, then first, answer the probe request with decoy probe responses including SSIDs and BSSIDs of defined iVAPs and second, answer the probe request with decoy probe responses including SSIDs of the defined iVAPs and with a same BSSID as one of the hidden VAPs, and wherein, if the probe request is a unicast probe request with a SSID defined by the one or more iVAPs, SSID1, then send a probe response with SSID1 and the same BSSID as the hidden VAP.

16. The non-transitory computer-readable storage medium of claim 14, wherein, the 4-way handshake allows a selected iVAP and the requesting station device to mutually determine that they each have the same PSK without sending the actual PSK to each other.

17. The non-transitory computer-readable storage medium of claim 16, wherein the 4-way handshake includes a message sent from the requesting station device to the VAP, containing a Supplicant Nonce (SNonce) and the MIC to prove possession of a pairwise transit key (PTK) which is derived from the PSK, wherein, an iVAP algorithm calculates the PSK and then the MIC of each defined iVAP matching the SSID the requesting station device is connected with (using a different passphrase), and wherein, the hidden VAP compares each calculated MIC with a requesting station device's MIC to determine which of the PSKs the requesting station device used, and wherein if none of the MICs matched, then the hidden VAP disconnects the requesting station device, wherein, if it did match one of the MICs then this matching PSK is used for future steps with the requesting station device.

18. The non-transitory computer-readable storage medium of claim 16, wherein if the defined iVAP set was found to match with the PSK of a connecting station device, then the VLAN ID of that iVAP set is used for communication of the connecting station device with a wired network.

19. The non-transitory computer-readable storage medium of claim 14, wherein, the probe request is sent via an open communication network associated with the one of the one or more iVAPs and concerning access to a secured communication network associated with the one of the one or more iVAPs.

20. A system for providing instant network secure access, the system comprising:

one or more access points (AP) configured to implement a MAC Layer Management entity (MLME);

an MLME Beacon comprising an iVAP Decoy Beacon;

an MLME Probe comprising an iVAP Decoy Probe;

an MLME Authentication; and an MLME Association, which comprises an iVAP SSID Checker.

\* \* \* \* \*